US011792446B2

(12) United States Patent
Chellappan et al.

(10) Patent No.: US 11,792,446 B2
(45) Date of Patent: Oct. 17, 2023

(54) METHODS AND APPARATUS TO REDUCE AUDIO STREAMING LATENCY BETWEEN AUDIO AND GIGABIT ETHERNET SUBSYSTEMS

(71) Applicant: Intel Corporation, Santa Clara, CA (US)

(72) Inventors: Satheesh Chellappan, Folsom, CA (US); Kishore Kasichainula, Phoenix, AZ (US); Frank Baehren, Pforzheim (DE)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 17/091,865

(22) Filed: Nov. 6, 2020

(65) Prior Publication Data

US 2021/0266610 A1 Aug. 26, 2021

Related U.S. Application Data

(63) Continuation of application No. 16/235,934, filed on Dec. 28, 2018, now Pat. No. 10,834,434.

(51) Int. Cl.
*G06F 17/00* (2019.01)
*H04N 21/233* (2011.01)
(Continued)

(52) U.S. Cl.
CPC ....... *H04N 21/233* (2013.01); *G06F 9/30003* (2013.01); *H04L 65/75* (2022.05); *H04L 65/80* (2013.01)

(58) Field of Classification Search
CPC ..... G06F 9/30003; H04L 65/75; H04L 65/80; H04N 21/233; H04N 21/41422; H04N 21/4392
(Continued)

(56) References Cited

U.S. PATENT DOCUMENTS

| 10,834,434 B2 | 11/2020 | Chellappan et al. |
| 2011/0231566 A1* | 9/2011 | Gelter .............. H04N 21/23608 709/231 |

(Continued)

OTHER PUBLICATIONS

Precision time protocol Wikipedia page (Year: 2018).*
(Continued)

*Primary Examiner* — Paul C McCord
(74) *Attorney, Agent, or Firm* — Hanley, Flight & Zimmerman, LLC

(57) ABSTRACT

Example methods, apparatus, systems and articles of manufacture to reduce audio streaming latency between audio and Gigabit Ethernet subsystems are disclosed herein. An example integrated circuit disclosed herein to process an audio stream associated with an endpoint device on a network includes an Ethernet subsystem to access the network and an audio subsystem to process audio data associated with the audio stream. The disclosed example integrated circuit also includes a direct hardware path between the Ethernet subsystem and the audio subsystem to exchange audio data between the Ethernet subsystem and the audio subsystem without the audio data being processed by a first software driver that is to provide access to the Ethernet subsystem or a second software driver that is to provide access to the audio subsystem.

17 Claims, 15 Drawing Sheets

(51) Int. Cl.
*G06F 9/30* (2018.01)
*H04L 65/80* (2022.01)
*H04L 65/75* (2022.01)

(58) Field of Classification Search
USPC .......................................................... 700/94
See application file for complete search history.

(56) References Cited

U.S. PATENT DOCUMENTS

| | | |
|---|---|---|
| 2012/0287337 A1 | 11/2012 | Kumar et al. |
| 2015/0052257 A1* | 2/2015 | Mora ................ H04L 12/40052 709/227 |
| 2015/0186311 A1* | 7/2015 | Yap ....................... G06F 1/3225 710/308 |
| 2016/0087917 A1 | 3/2016 | Alsup |
| 2017/0177527 A1 | 6/2017 | Lovett et al. |
| 2017/0249214 A1 | 8/2017 | Kopetz |
| 2019/0158890 A1 | 5/2019 | Chellappan et al. |

OTHER PUBLICATIONS

Time sensitive networking Wikipedia page (Year: 2018).*
Intel Ethernet Network Adapter XXV710-DA2T manual, 2017.
United States Patent and Trademark Office, "Notice of Allowance," mailed in connection with U.S. Appl. No. 16/235,934, dated Jun. 24, 2020, 8 pages.
United States Patent and Trademark Office, "Non-Final Rejection," mailed in connection with U.S. Appl. No. 16/235,934, dated Dec. 31, 2019, 14 pages.

* cited by examiner

METHODS AND APPARATUS TO REDUCE AUDIO STREAMING LATENCY BETWEEN AUDIO AND GIGABIT ETHERNET SUBSYSTEMS

RELATED APPLICATION(S)

This patent arises from a continuation of U.S. patent application Ser. No. 16/235,934 (now U.S. Pat. No. 10,834, 434), which is titled "METHODS AND APPARATUS TO REDUCE AUDIO STREAMING LATENCY BETWEEN AUDIO AND GIGABIT ETHERNET SUBSYSTEMS," and which was filed on Dec. 28, 2018. Priority to U.S. patent application Ser. No. 16/235,934 is hereby claimed. U.S. patent application Ser. No. 16/235,934 is hereby incorporated by reference in its entirety.

FIELD OF THE DISCLOSURE

This disclosure relates generally to audio streaming, and, more particularly, to methods and apparatus to reduce audio streaming latency between audio and Gigabit Ethernet subsystems.

BACKGROUND

Audio Video Bridging (AVB) is a protocol for streaming audio and video traffic over Ethernet networks. For example, professional audio/video gear, such as that used in recording studios, public address systems, etc., employ AVB to convey audio and/or video streams between audio and video endpoints networked via an Ethernet network. Such endpoints can include, but are not limited to, media devices, speakers, microphones, etc., some of which may implement advanced audio features, such as active noise cancelling, echo cancellation, speech processing, etc.

BRIEF DESCRIPTION OF THE DRAWINGS

The figures are not to scale. In general, the same reference numbers will be used throughout the drawing(s) and accompanying written description to refer to the same or like parts, elements, etc.

DETAILED DESCRIPTION

Figure 1:
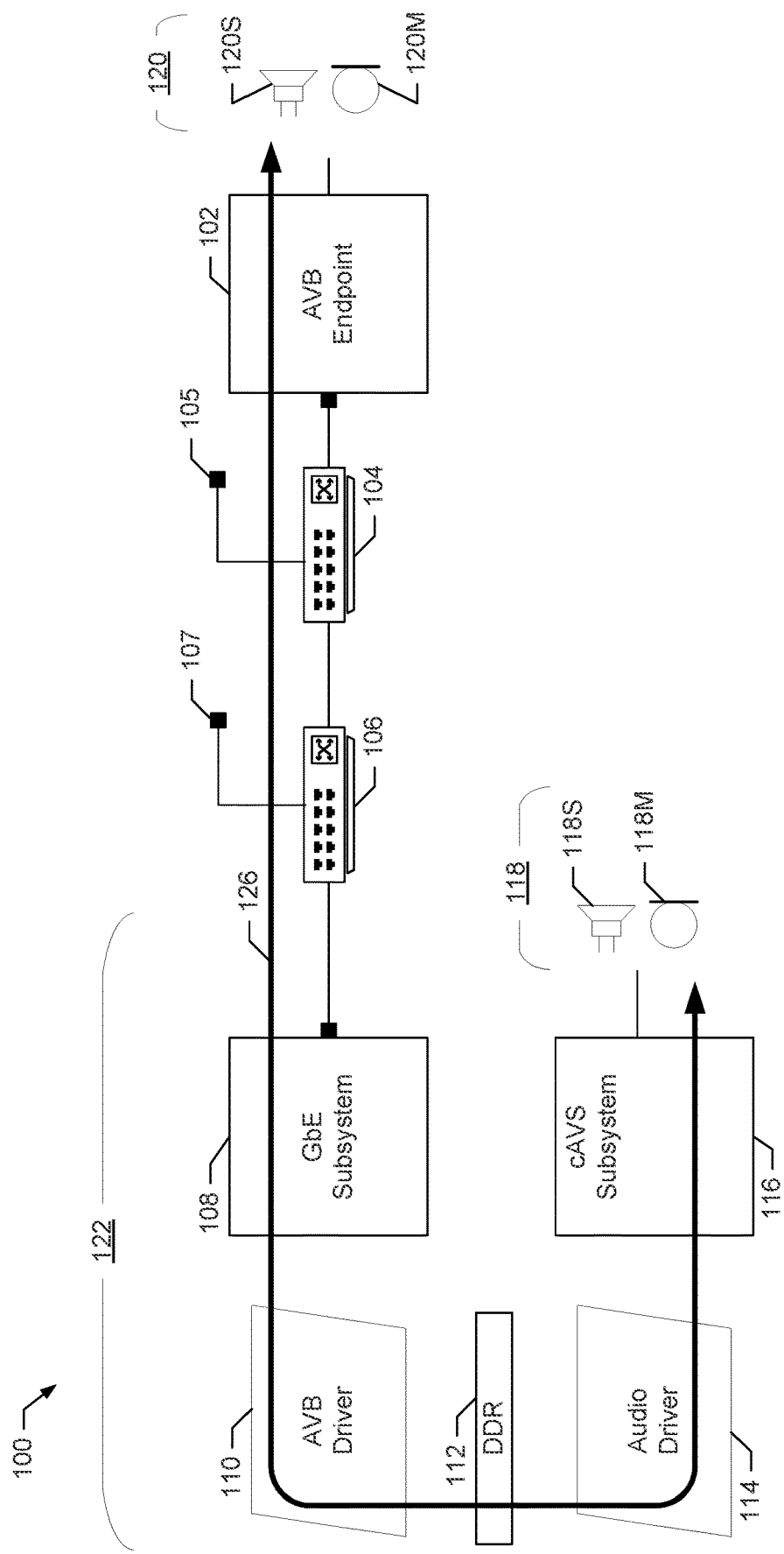
FIG. 1 illustrates a block diagram of an example AVB system including an example system-on-a-chip (SoC) integrated circuit that implements an example AVB direct attach (ADA) feature to reduce audio streaming latency between audio and Gigabit Ethernet subsystems in accordance with teachings of this disclosure.

Example methods, apparatus, systems and articles of manufacture (e.g., physical storage media) to reduce audio streaming latency between audio and Gigabit Ethernet subsystems are disclosed herein. As noted above, AVB is a protocol for streaming audio and video traffic over Ethernet networks. The AVB protocol enables audio and/or video streams to be conveyed between audio and video endpoints (e.g., media devices, speakers, microphones, etc.) networked via an Ethernet network. For example, professional audio/video gear, such as that used in recording studios, public address systems, etc., employ AVB to convey audio and/or video streams, as well as other control/communication interfaces, between the endpoints at different locations in a vehicle, in a plant, etc. AVB also includes global time synchronization using precision time protocol (PTP) to enable phase synchronization of multiple audio streams being communicated to different endpoints, such as from a media device (e.g., entertainment unit) to multiple speakers at different locations in an automobile, in a warehouse, etc.

Increasingly, audio and video endpoints networked using AVB implement advanced audio features, such as active noise cancelling, echo cancellation, speech processing, etc. For example, an audio system for an automobile may not only play audio via the automobile's speakers, but may also include one or more microphones to capture audio for input to such advanced audio features as active noise cancelling, echo cancellation, etc. However, such advanced audio features may rely on low audio path latency to achieve acceptable performance (e.g., acceptable audio quality). For example, to achieve acceptable performance, active noise cancellation technologies may rely on low latency for the input microphone audio capture path so that the input audio processed by the active noise cancellation feature provides an accurate characterization of the audio to be cancelled.

Current audio solutions for AVB include System-on-a-Chip (SoC) architectures that implement separate hardware Ethernet and audio subsystems that are accessed and connected together by respective host software stacks, such as an AVB software driver (also referred to as an AVB driver) to access the Ethernet subsystem and an audio software driver (also referred to as an audio driver) to access the audio subsystem. The host software stacks are executed by one or more host processors implemented by the SoC. When the Ethernet and audio subsystems are connected through their respective host software stacks, the latency of an audio stream is lower bounded by the latency of the operating system (OS) executed by the SoC host processor(s). Unfortunately, such latency experienced by current audio solutions that perform AVB through connected host software stacks may exceed the latency expected by audio features offered by an AVB system.

Example methods, apparatus, systems and articles of manufacture (e.g., physical storage media) disclosed herein provide technical solutions to reduce the technical problem of end-to-end audio path latency in prior AVB systems. To reduce audio path latency, example technical solutions disclosed implement an example AVB Direct Attach (ADA) feature that provides a direct hardware path between a converged audio voice subsystem (cAVS) and an Ethernet subsystem, such as a Gigabit Ethernet Controller (GbE controller), implemented by an SoC. Providing a direct hardware path can reduce the end-to-end audio path latency substantially, such as by an order of magnitude (e.g., from 35 ms. to 3 ms.). The ADA feature disclosed herein allows advanced audio features, such as active noise cancelling, echo cancellation, speech processing, etc., to meet desired performance characteristics (e.g., quality of service (QoS)) that are functions of end-to-end audio path latency. As further disclosed herein, example solutions to implement ADA also provide means for offloading an AVB audio stream from an audio path using host software stacks (software drivers) to connect Ethernet and audio subsystems to a direct hardware path that attaches the Ethernet and audio subsystems of the SoC without processing by the host software stacks (software drivers).

Turning to the drawings, FIG. 1 illustrates a block diagram of an automotive AVB system 100 that implements an example ADA feature to reduce audio streaming latency between audio and Gigabit Ethernet subsystems in accordance with teachings of this disclosure. In the illustrated example of FIG. 1, the AVB system 100 is depicted as an AVB network 100, but the AVB system 100 could correspond to any type of time-sensitive network, such as a time-sensitive network specified by the IEEE 802.1 suite of specifications. For example, the AVB system of the illustrated example may implement an automotive audio system 100. The example AVB system 100 of FIG. 1 includes example AVB endpoint 102, 105 and 107, an example first AVB compliant Ethernet switch 104, an example second AVB compliant Ethernet switch 106, an example Gigabit Ethernet (GbE) subsystem 108, an example AVB driver 110 (also referred to as an example AVB software (SW) stack 110), an example double data rate (DDR) memory 112, an example audio driver 114 (also referred to as an example audio SW stack 114), an example converged audio and voice subsystem (cAVS) 116, example first audio peripherals 118 including an example first speaker 118S and an example first microphone 118M, and example second audio peripherals 120 including an example second speaker 120S and an example second microphone 120M. In the illustrated example system 100 of FIG. 1, the GbE subsystem 108, the AVB driver 110, the DDR memory 112, the audio driver 114, and the cAVS subsystem 116 are implemented on a system-on-a-chip (SoC) 122 residing in, for example, a head entertainment unit of an automobile. In some such examples, the AVB endpoint 102 resides in a rear entertainment unit of the automobile.

In some examples, an audio signal streaming (from an external source) at the AVB endpoint 102 is to be played by the speaker 118S coupled to the cAVS 116. In an example in which ADA feature is not enabled for the audio signal streamed at the AVB endpoint 102, the audio signal takes a first path 126 that begins at the AVB endpoint 102, and proceeds to the GbE subsystem 108, the AVB driver 110, the DDR memory 112, the audio driver 114 and to the cAVS subsystem 116 for rendering at the speaker 118S. However, as described above, the path 126 may exhibit in high latency due to the portion of the path 126 processed by the AVB driver 110 and the audio driver 114.

Figure 2:
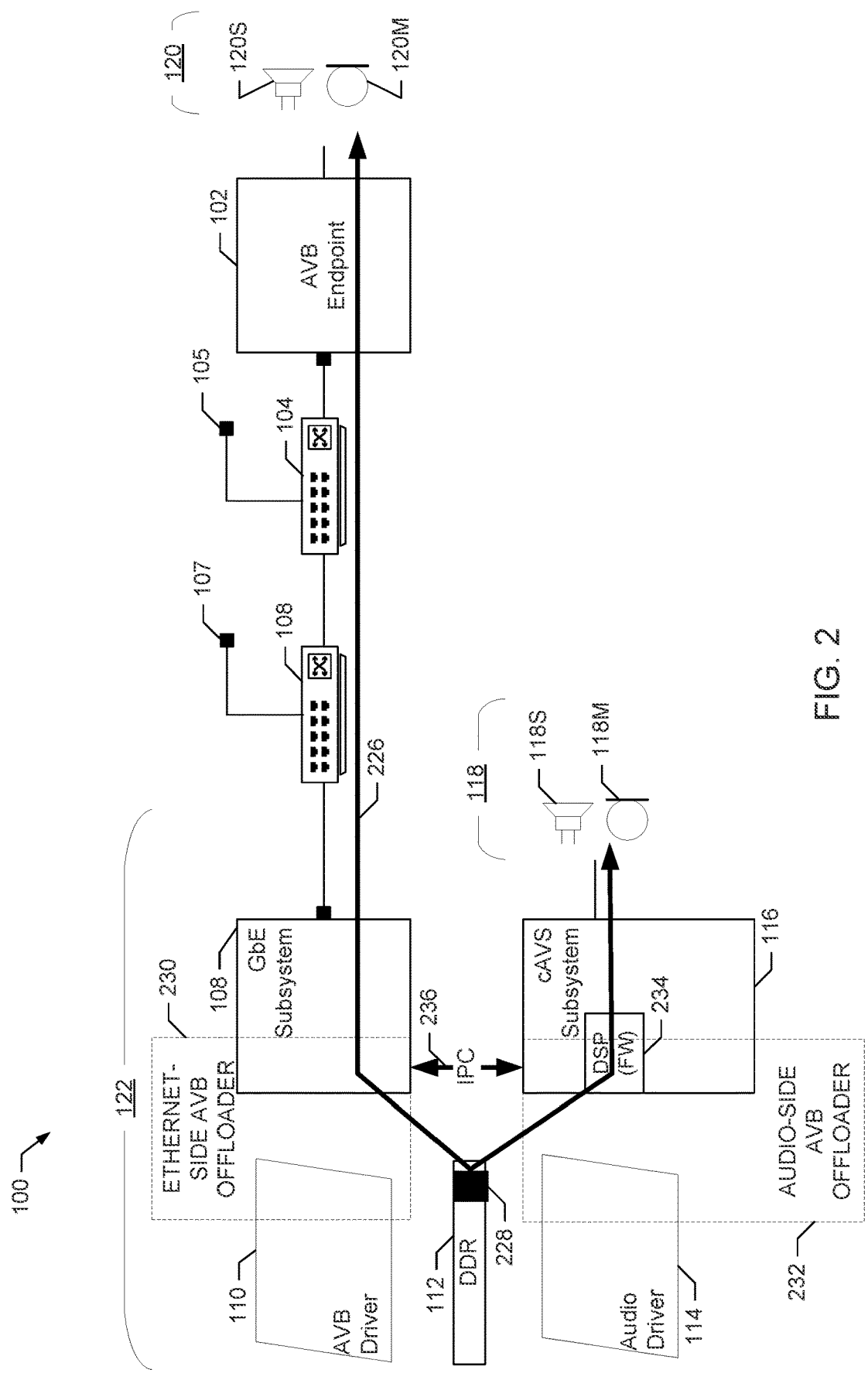
FIG. 2 illustrates a block diagram of the example AVB system of FIG. 1 in which the ADA feature is enabled by the example SoC integrated circuit for an audio signal streamed at an example AVB endpoint.

FIG. 2 illustrates a block diagram of the example AVB system 100 of FIG. 1 in which the ADA feature is enabled for the audio signal streamed at the AVB endpoint 102. The illustrated example of FIG. 2 corresponds to an audio capture path from the AVB endpoint 102 to the SoC 122 in which the audio signal takes a second path 226 that begins at the AVB endpoint 102 and proceeds to the GbE subsystem 108. At the GbE subsystem 108, the audio stream is offloaded from the AVB driver 110 and the audio driver 114 and, instead, proceeds directly to the DDR memory 112 and then to the cAVS subsystem 116. As such, the DDR memory 112 can correspond to any system and/or local memory (e.g., such as, but not limited to static random access memory (SRAM)) that is accessible by both the GbE subsystem 108 and the cAVS subsystem 116. In some examples, the ADA feature utilizes an example dedicated portion 228 of the DDR memory 112 to maintain the data structures used to transfer audio data for a given stream when the ADA feature is enabled for that stream. Thus, the second path 226 is a direct hardware path between the cAVS subsystem 116 and the GbE subsystem 108, which bypasses the AVB driver 110 and the audio driver 114. For an audio render path from the SoC 122 to the AVB endpoint 102 in which the ADA feature is enabled, the audio signal would take a similar direct hardware path as the path 226, but in the reverse direction. In this way, once the ADA feature is enabled for a given stream, audio data for that audio stream is exchanged between the GbE subsystem 108 and the cAVS subsystem 116 without being processed by the AVB driver 110 and the audio driver 114 (e.g., without the AVB driver 110 and the audio driver 114 being invoked, executed, called, etc., to exchange the audio data between the GbE subsystem 108 and the cAVS subsystem 116).

In the illustrated example, the SoC 122 offloads an AVB audio stream from a conventional software-based path (e.g., the path 126) to a direct hardware path (e.g., the path 226) using AVB offloading functionality illustrated as an example Ethernet-side AVB offloader 230 and an example audio-side AVB offloader 232 in FIG. 2. In the illustrated example, the Ethernet-side AVB offloader 230 is collectively implemented by the GbE subsystem 108 and the AVB driver 110, and the audio-side AVB offloader 232 is collectively implemented by the cAVS subsystem 116 and the audio driver 114. Once the AVB audio stream has been offloaded to the direct hardware path (e.g., the path 226), an example processor 234 of the cAVS subsystem 116, such as an example digital signal processor (DSP) 234 included in the cAVS subsystem 116, controls the transfer of audio data between the cAVS subsystem 116 and the GbE subsystem 108 using an example inter-process communication (IPC) interface 236 implemented by SoC 122 to allow elements of the SoC to intercommunicate. Although the processor 234 is illustrated as a DSP in the example of FIG. 2, in other examples, the processor 234 could be implemented by any other type of processing element, such as a hardware accelerator, a programmable digital logic device, etc. Furthermore, although the interface 236 is illustrated as an IPC interface in the example of FIG. 2, in other examples, the interface 236 could be implemented by any other type of interface architecture, such as a read/write register interface, a memory mapped interface, etc.

Figure 3:
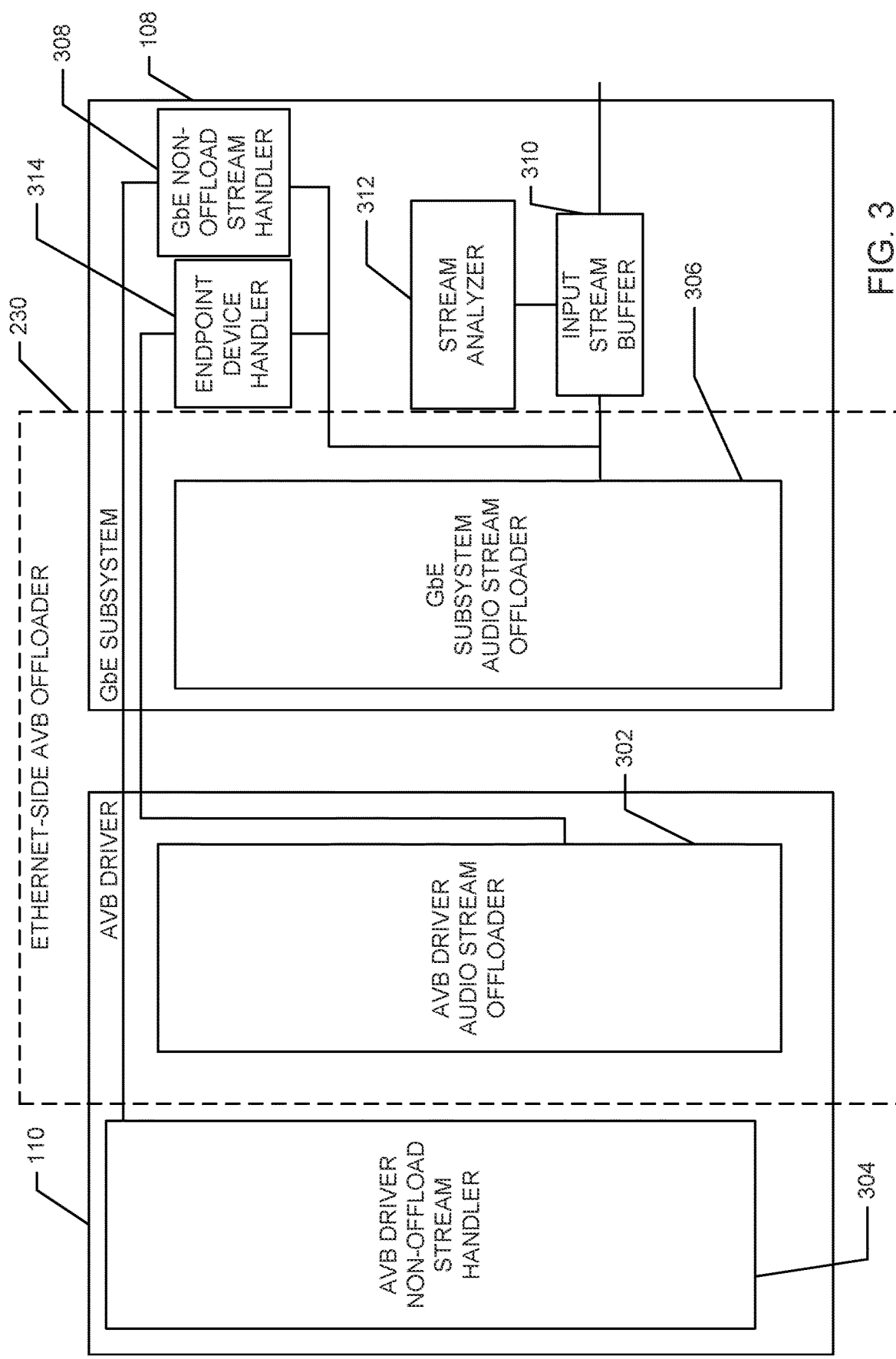
FIG. 3 illustrates a block diagram of an example Ethernet-side AVB offloader 230 included in the example SoC integrated circuit of FIG. 2.

FIG. 3 illustrates an example implementation of the Ethernet-side AVB offloader 230 of FIG. 2, as well as other elements of the GbE subsystem 108 and the AVB driver 110 that are used to implement the ADA feature in the illustrated example. In the example of FIG. 3, the AVB driver 110 includes an example AVB driver audio stream offloader 302 and an example AVB driver non-offload stream handler 304. In the example of FIG. 3, GbE subsystem 108 includes an example GbE subsystem audio stream offloader 306, an example GbE non-offload stream handler 308, an example input stream buffer 310, an example stream analyzer 312, and an example endpoint device handler 314. In in the illustrated example, the AVB driver audio stream offloader 302 and the Gbe subsystem portion of GbE subsystem audio stream offloader 306 operate cooperatively during initial audio stream offloading to implement the Ethernet-side AVB offloader 230 to initially transfer (or, in other words, handoff) the audio streams that are to be offloaded to a direct hardware path (e.g., the path 226) in the SoC 122.

In some examples, an audio stream supplied by the endpoint device 102 (see FIG. 1 and FIG. 2) is received at the input stream buffer 310. The stream analyzer 312 analyzes the input stream in the input stream buffer 310. In some examples, the stream analyzer 312 determines, based on a virtual local area network (VLAN) tag included in the stream, that the stream is not to be offloaded. In some such examples, the stream analyzer 312 causes the input stream buffer 310 to supply the stream to the GbE non-offload stream handler 308. In response, the GbE non-offload stream handler 308 performs one or more actions needed to prepare the stream for conventional handling by the AVB driver non-offload stream handler 304. In some such examples, the GbE non-offload stream handler 308 also supplies the stream to the AVB driver non-offload stream handler 304. The AVB driver non-offload stream handler 304 operates to prepare the stream for transmission to the AVB driver 110, which further causes the stream to be stored in the DDR memory 112 for subsequent access by the audio driver 114.

In other examples, the stream analyzer 312 determines that the audio stream received at the input stream buffer 310 from the endpoint device 102 includes a VLAN tag that indicates that the ADA feature is to be enabled for the audio stream and, thus, the audio stream is to be offloaded to a direct hardware path connecting the GbE subsystem 108 and the cAVS subsystem 116 (e.g., using the dedicated portion 228 of the DDR memory 112), rather than being processed through the AVB driver 110 and the audio driver 114. In some such examples, the stream analyzer 212 causes the input stream to be supplied to the GbE subsystem audio stream offloader 306.

In some examples, the stream analyzer 312 determines that the stream received at the input stream buffer 310 includes a communication from the endpoint device 102 announcing that the endpoint device 102 has coupled to the AVB system 100. In some such examples, the example stream analyzer 312 causes the communication to be transmitted to the example endpoint device handler 314. The endpoint device handler 314 causes the communication to be transferred to the example AVB driver audio stream offloader 302 for use in determining whether audio stream(s) received from (or to be supplied to) the endpoint device 102 is(are) to be offloaded to a direct hardware path connecting the GbE subsystem 108 and the cAVS subsystem 116.

Figure 4:
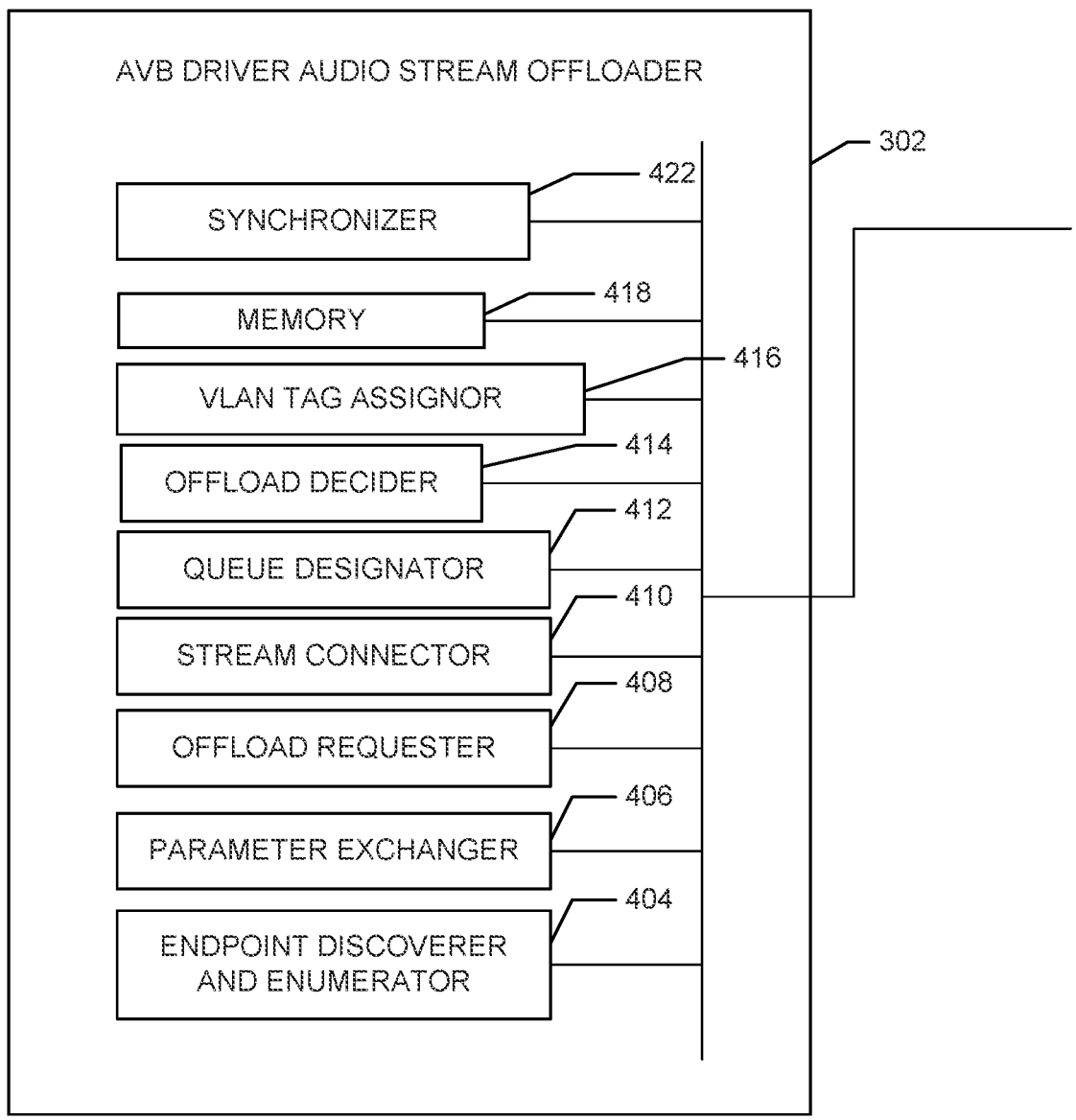
FIG. 4 illustrates a block diagram of an example AVB driver audio stream offloader included in the example SoC integrated circuit of FIG. 2.

FIG. 4 illustrates a block diagram of an example implementation of the AVB driver audio stream offloader 302 of FIG. 3. In the illustrated example, the AVB driver audio stream offloader 302 includes an example endpoint discoverer and enumerator 404, an example parameter exchanger 406, an example offload requester 408, an example stream connector 410, an example queue designator 412, an example offload decider 414, an example VLAN tag assignor 416, example local memory 418, and an example synchronizer 422, which implement functionality associated with the initial offloading of an audio stream to a direct hardware path connecting the GbE subsystem 108 and the cAVS subsystem 116. In some examples, when the endpoint device 102 couples to the AVB system 100, the endpoint device 102 transmits a message over the Ethernet network announcing the device's presence. In some examples, the message is received at the example input stream buffer 310 of the GbE subsystem 108. As described above with respect to FIG. 3, the stream analyzer 312 determines that the information stored in the input stream buffer 310 includes a message containing an announcement and causes the message to be transmitted to the endpoint device handler 314. In return, the endpoint device handler 314 causes the message to be communicated to the example AVB driver audio stream offloader 302. Additionally or alternatively, in some examples, the AVB driver audio stream offloader 302 periodically transmits (e.g., via the GbE subsystem 108) queries on the Ethernet network of the AVB system 100 for the presence of new endpoint devices (e.g., such as the devices 105 and 107). In some examples, responses to the queries are treated as messages announcing the presence of an endpoint device.

In some examples, when the AVB driver audio stream offloader 302 receives a presence announcement message from an endpoint device, such as the endpoint device 102, the AVB driver audio stream offloader 302 begins a negotiation process by which the Ethernet-side AVB offloader 230 and the endpoint device 102 agree upon various aspects of the connection. In some examples, the negotiation process begins when the example endpoint discoverer and enumerator 404 performs a set of discovery and enumeration functions. In some examples, the endpoint device 102 and the endpoint discoverer and enumerator 404 establish a communication channel between the endpoint device 102 and the Ethernet-side AVB offloader 230. In some examples, the endpoint device 102 can be a "listener" device (e.g., a speaker, an audio headset, etc.) or a "talker" device (e.g., a microphone) or both.

In some examples, the example endpoint discoverer and enumerator 404 reads device capability information supplied by the endpoint device 102. In some examples, the endpoint discoverer and enumerator 404 obtains a MAC address of the endpoint device 102, a device identifier, a stream identifier, a timestamp, a gateway identifier, etc. In some examples, the endpoint discoverer and enumerator 404 obtains information identifying any audio streaming capabilities of the endpoint device 102. The endpoint discoverer and enumerator 404 compares the audio streaming capabilities of the endpoint device 102 with audio application services available from the cAVS subsystem 116 of the SoC 122. Upon making the comparison, the endpoint discoverer and enumerator 404 identifies any of the services available from the cAVS subsystem 116 of the SoC 122 that are relevant to (e.g., useable by) the endpoint device 102 and notifies the endpoint device of such relevant services.

In some examples, the example endpoint discoverer and enumerator 404 performs any of a variety of other operations including, but not limited to: determining a number of streams to be supplied by or to the endpoint device 102, determining a direction in which streams will travel on the AVB system 100 between the SoC 122 and the endpoint device 102, determining a number of channels to be allotted for each of the streams, etc. Based on this information, the endpoint discoverer and enumerator 404 provides the endpoint device 102 with a sampling rate, a sample size, etc., by which streams are to be communicated between the endpoint device 102 and the SoC 122.

In the illustrated example, the stream connector 410 performs a next phase of the negotiation sequence by determining a connection topology of the AVB system 100. The connection topology indicates, for example, a manner in which the endpoint device 102 is connected to one or more other endpoints in the AVB system 100. For example, the endpoint device 102 can render the same and/or different streams to one or more other endpoints of the AVB system). In another example, in the case of stream capture, there can be one or more AVB stream connections from multiple endpoints delivered to the endpoint 102 acting as a receiving endpoint.

In the illustrated example, the synchronizer 422 performs a further phase of the negotiation sequence by synchronizing the AVB real-time audio streams with a global precision time protocol (PTP) time managed by the SoC 122. The PTP timer source may be implemented in the SoC 122 or may be implemented in any other device in the AVB system 100. Synchronizing in this manner allows different "speakers" of the AVB system 100 to be phase synchronized at sub sample accuracy (e.g., in the range of tens of nanoseconds) over multiple switch hops. The accuracy is achieved in accordance with the AVB PTP specification and a low jitter grand master clock in the SoC 122 maintains time alignment of PTP presentation time. For PTP slave endpoints the presentation time is accounted for with offset to the master clock maintained by the SoC 122.

Once the negotiation sequence and synchronization is completed such that the endpoint device 102 has been initialized and enumerated, bandwidth has been reserved, the connection topology has been determined and the endpoint device 102 has been synchronized with the SoC 122, the example offload decider 414 determines whether to enable the ADA feature for offloading audio streams received from and/or transmitted to the endpoint device 102 to a direct hardware path for communication with the cAVS subsystem 116, instead of processing the audio streams via the AVB driver 110 and the audio driver 114. In some examples, a decision to offload audio streams associated with the endpoint device 102 is based on an AVB device type and identifier associated with the endpoint device 102, as well as the capabilities of the GbE subsystem 108. In some examples, the offload decider 414 consults a whitelist including a list of whitelisted device types, device identifiers, vendor identifiers, virtual local area network (VLAN) tags, VLAN priority parameters, stream identifiers (e.g., "stream_id" parameters), destination medium access control (DMAC) addresses, etc., associated with endpoint devices that are suitable for ADA offloading. In some examples, the whitelist is stored in the local memory 418, which may be any read/write memory such that the whitelist is updateable over time (e.g., by an original equipment manufacturer (OEM) that updates the whitelist).

In some examples, if the example offload decider 414 determines that an AVB stream associated with the endpoint device 102 is to be offloaded to a direct hardware path in the SoC 122 (based on the list of whitelisted devices), the offload decider 414 notifies the example queue designator 412 and the example VLAN tag assignor 416. The queue designator 412 responds to the notification by configuring dedicated queues in the GbE subsystem 108 by which audio streams that are transferred between the GbE-side AVB offloader 230 and the example audio-side AVB offloader 232 by way of the example DDR memory 112 (e.g., the dedicated portion 228 of the DDR memory 112) are communicated to/from the Ethernet network of the AVB system 100. The dedicated queues are illustrated in the example implementation of the GbE subsystem audio stream offloader 306 shown in FIG. 6, which is discussed further hereinbelow.

Referring still to FIG. 4, in the illustrated example, the VLAN tag assignor 416 determines one or more VLAN tags to be carried by the audio streams communicated between the endpoint device 102 and the SoC 122. In some examples, the VLAN tag assignor 316 communicates the tags to the endpoint device 102 so that in future communications, the endpoint device 102 embeds the VLAN tag in an Ethernet header packet of streams that are communicated to the Ethernet-side AVB offloader 230. The VLAN tags and the dedicates queues (discussed further below) are used to isolate the offloaded streams from other Ethernet traffic processed by the GbE subsystem 108 of the SoC 122.

In the illustrated example of FIG. 4, the offload requestor 408 generates an offload request to be sent to the example audio-side AVB offloader 232. The offload request is a request to offload audio streams received from (or to be transmitted to) the endpoint device 102. The offload requestor 408 causes an example GbE subsystem IPC transceiver 626 (see FIG. 6) of the GbE subsystem audio stream offloader 306 to transmit the offload request to the example audio-side AVB offloader 232 via the example sideband IPC interface 235 (see FIG. 2). In some examples, the offload request includes a request for information about features offered by the cAVS subsystem 116 and a request to perform the offload. When the request to offload is accepted by the audio-side AVB offloader 232, the example parameter exchanger 406 of FIG. 4 communicates parameters to the audio-side AVB offloader 232 for use in supporting the offloaded audio streams. In some examples, the parameters include a number of channels to be included in the stream, a sample frame rate of the stream, a sample size, etc. In some examples, the parameters transmitted by the parameter exchanger 406 to the audio-side AVB offloader 232 include AVB header information. Such information can include an AVB identifier (AVBID) that is unique to streams associated with the endpoint device 102, such as, but not limited to, a stream identifier (e.g., a "stream_id" parameter), a destination medium access control (DMAC) address, etc. Additionally or alternatively, in some examples, the AVBID can be information that is unique to a class of streams, such as, but not limited to, a VLAN tag, a VLAN priority parameter, etc.

As described in further detail below, the audio-side AVB offloader 232 uses the AVBID to generate a work descriptor to be used by the Ethernet-side AVB offloader 230 and the audio-side AVB offloader 232 to process offloaded audio streams. In some examples, the example parameter exchanger 406 also transmits the VLAN tags assigned by the VLAN tag assignor 416 as well as PTP synchronization support information to the audio-side AVB offloader 232. The audio-side AVB offloader 232 uses the information to determine whether available hardware and firmware resources in the cAVS subsystem 116 are sufficient to support the processing of the offloaded audio stream. Based on whether such resources are sufficient, the audio-side AVB offloader 232 either accepts or rejects the offload request.

When the offload request is rejected, AVB audio streams received from and/or delivered to the endpoint device 102 will not be offloaded to direct hardware paths in the SoC 122 but, instead, will be handled via conventional software-based paths (e.g., the path 126) described above. However, when the offload request is accepted, AVB audio streams received from and/or delivered to the endpoint device 102 will be offloaded to direct hardware paths (e.g., the path 226) as described above and in further detail below.

Figure 5:
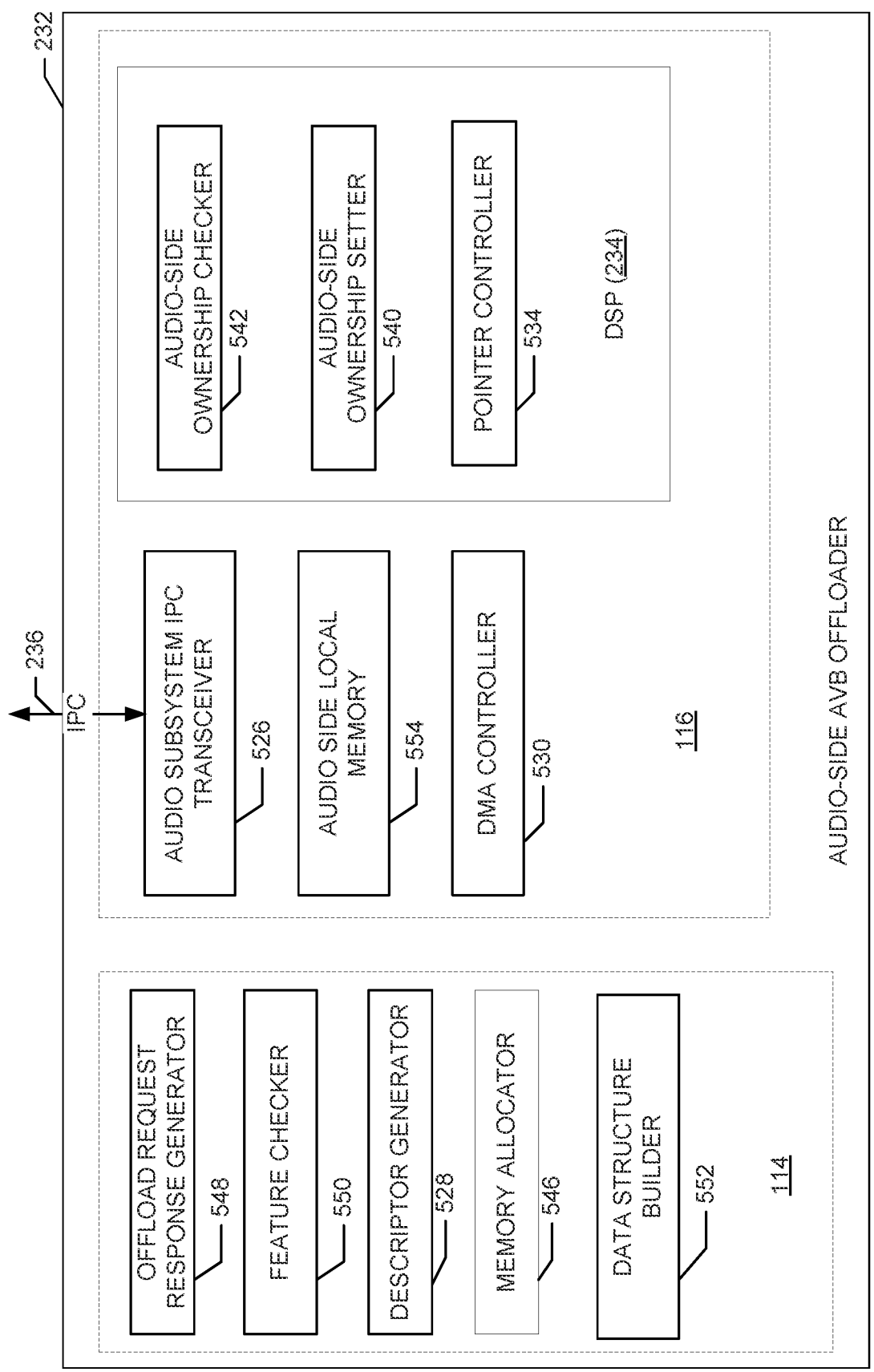
FIG. 5 illustrates a block diagram of an example audio-side AVB offloader 232 included in the example SoC integrated circuit of FIG. 2.

FIG. 5 is an example implementation of the audio-side AVB offloader 232. In the illustrated example, the audio-side AVB offloader 232 include an example audio subsystem IPC transceiver 526, an example descriptor generator 528, an example direct memory access (DMA) controller 530, an example pointer controller 534, an example audio-side ownership setter 540, an example audio-side ownership checker 542, an example memory allocator 546, an example offload request response generator 548, an example feature checker 550, an example data structure builder 552, and example audio-side local memory 554. In the example of FIG. 5, the audio driver 114, which is implemented by software and/or firmware in the illustrated example, implements the descriptor generator 528, the memory allocator 546, the offload request response generator 548, the feature checker 550, and the data structure builder 552, as shown, which implement functionality associated with the initial offloading of an audio stream to a direct hardware path connecting the GbE subsystem 108 and the cAVS subsystem 116. In the example of FIG. 5, the DSP 234 of the cAVS subsystem 116, which is implemented by hardware in the illustrated example, executes firmware to implement the pointer controller 534, the audio-side ownership setter 540, and the audio-side ownership checker 542, as shown, which implement functionality associated with the steering of audio data associated with an audio stream that has been offloaded to a direct hardware path connecting the GbE subsystem 108 and the cAVS subsystem 116.

As described above, the Ethernet-side AVB offloader 230 initiates a request to offload an audio stream associated with an AVB endpoint, such as the AVB endpoint 102, to a direct hardware path in accordance with the ADA feature described herein. In the illustrated example of FIG. 5, the request is received by the offload request response generator 548, which invokes the feature checker 550 to determine whether cAVS subsystem 116 includes an ability to enable the ADA feature for the given audio stream(s) associated with the AVB endpoint 102. In some examples, the feature checker 550 uses the stream parameters received from the parameter exchanger 406 (see FIG. 4) to cross check hardware and firmware resources available in the cAVS subsystem 116 to ensure there is sufficient support for the offloading of streams. Example resource checks can include checks for firmware module availability, DMA channel availability, internal bandwidth allocation, etc. If there are sufficient resources, the example feature checker 550 confirms the ability to offload the audio streams associated with the endpoint 102 to a direct hardware path. The offload request response generator 548 then transmits an appropriate response to the Ethernet-side AVB offloader 230 indicating whether the offload request is accepted or rejected.

In the illustrated example of FIG. 5, to prepare to handle the offloaded audio streams, the example memory allocator 546 allocates a portion of the DDR memory 112 (which, as described above, can correspond to any system and/or local memory that is accessible by both the GbE subsystem 108 and the cAVS subsystem 116) for storing the offloaded streams during transfer between the GbE subsystem 108 and the cAVS subsystem 116. In some examples, the memory allocator 546 allocates one or more portions of the DDR memory 112, such as the portion 228 illustrated in FIG. 2, that are not accessible to other entities of the SoC 122. In the illustrated example, the data structure builder 552 further generates a data structure in the allocated portion 228 of the DDR memory 112 to support offloading of communication of audio streams directly between the GbE subsystem 108 and the cAVS subsystem 116. In some examples, the data structure is implemented as a circular ring of work descriptors, also referred to as a circular descriptor ring, with each work descriptor including a pointer that points to a respective payload buffer included in a payload section allocated in the portion 228 of the DDR memory 112. Example work descriptors, payload buffers and associated data structures are described in further detail below.

In some examples, when the offload request is accepted, the example data structure builder 552 generates a data structure in the example audio side local memory 554 to support offloading the audio stream(s) associated with the endpoint 102. In some examples, the data structure is formatted similar, or identical, to the data structure created in the DDR memory 112 by the data structure builder 552 (e.g., and, thus, is structured as a circular descriptor ring with corresponding payload buffers associated with the work descriptors in the ring). In some such examples, the data structure builder 552 invokes the example descriptor generator 528 to generate one or more work descriptors corresponding to each audio stream to be offloaded for the endpoint device 102. In some examples, multiple work descriptors are generated for a given audio stream and arranged in a circular ring to allow pipelined processing of the audio stream's data packets. A work descriptor is used to identify a given stream associated with the example AVB endpoint 102 and includes a pointer address to a data payload buffer associated with that stream. In some examples, one workload descriptor may handle multiple streams (e.g., such as aggregated streams). For a workload descriptor included in the data structure maintained in the audio side local memory 554, the pointer address contained in the descriptor identifies a location in the audio side local memory 554 at which a payload of the audio stream associated with the work descriptor is to be stored. For a workload descriptor included in the data structure maintained in the DDR memory 112, the pointer address contained in the descriptor identifies a location in the DDR memory 112 at which a payload of the audio stream associated with the work descriptor is to be stored.

The example audio-side AVB offloader 232 of FIG. 5 includes the example pointer controller 534 to generate enqueue pointers and check dequeue pointers, respectively, to enable data to be written to and read from the data structures created by the data structure builder 552 in the DDR memory 112 and the audio side local memory 554. For a given circular ring descriptor created in the DDR memory 112 for a given offloaded audio stream associated with an AVB endpoint, such as the endpoint 102, the pointer controller 534 generates an enqueue pointer in the DDR memory 112 that points to the next work descriptor in the ring identifying the next payload buffer to which a next audio packet associated with the audio stream is to be stored. The pointer controller 534 also maintains a shadow copy of a dequeue pointer that the GbE subsystem 108 generates to point to the next work descriptor in the ring in the DDR memory 112 at which a next audio payload buffer associated with the audio stream is to be accessed (e.g., read from or written to) by the GbE subsystem 108. For the corresponding circular ring descriptor created in the audio side local memory 554 for that offloaded audio stream, the pointer controller 534 can maintain corresponding shadow copies of the enqueue and dequeue pointers that shadow the corresponding pointers in the DDR memory 112. The shadow pointers for the corresponding circular ring descriptor in the audio side local memory 554 enable the contents of the data structure in the audio side local memory 554 to be transferred to/from the data structure in the DDR memory 112 using direct memory access (DMA) transfers managed by the DMA controller 530. In some examples, the pointer controller 534 maintains additional pointers, such as a last dequeue pointer to point to the last work descriptor from which data was dequeued by the GbE subsystem 108 (e.g., to avoid overrun events), etc.

As an example, when writing data being rendered by the cAVS subsystem 116 for the given audio stream, the pointer controller 534 generates the enqueue pointer for the circular ring descriptor in the audio side local memory 554 for that audio stream such that the enqueue pointer points to the descriptor identifying the next payload buffer in the audio side local memory 554 to which audio data is to be written. The pointer controller 534 also generates the corresponding enqueue pointer for the shadowed circular ring descriptor in the DDR memory 112 once the written data has been DMA transferred from the audio side local memory 554 to the DDR memory 112 such that the enqueue pointer points to the descriptor in the DDR memory 112 identifying the corresponding payload buffer to which the data was written. Likewise, when reading data being captured by the cAVS subsystem 116 for the given audio stream, the pointer controller 534 generates an enqueue pointer for the shadowed circular ring descriptor in the DDR memory 112 which points to the descriptor identifying the next payload buffer to which the GbE subsystem 108 is to write the audio data for that audio stream. The pointer controller 534 also generates a corresponding shadow enqueue pointer for the circular ring descriptor in the audio side local memory 554 for that audio stream once the audio data for that stream has been DMA transferred from the audio side local memory 554 to the DDR memory 112 such that the shadow enqueue pointer points to the descriptor in the audio side local memory 554 identifying the payload buffer in the audio side local memory 554 to which the audio data was DMA transferred.

In some examples, each work descriptor includes an ownership bit. As such, the example audio-side AVB offloader 232 of FIG. 5 includes the audio-side ownership setter 540 to set the ownership bit of a given work descriptor, and includes the audio-side ownership checker 542 to test the ownership bit of a given work descriptor to determine whether the work descriptor is owned by the GbE subsystem 108 or the cAVS subsystem 116. For example, for a workload descriptor associated with an offloaded audio stream to be captured by the cAVS subsystem 116, the audio side ownership setter 540 sets the ownership bit to indicate that the GbE subsystem 108 initially owns the workload descriptor. Once data is written to the workload descriptor by the GbE subsystem 108, the ownership bit is set to indicate the cAVS subsystem 116 owns the workload descriptor. Before attempting to read data from the workload descriptor, the audio-side ownership checker 542 tests the ownership bit to confirm the cAVS subsystem 116 owns the workload descriptor. Once ownership is confirmed, the cAVS subsystem 116 can read the audio data from the payload buffer associated with the workload descriptor. The audio side ownership setter 540 then sets the ownership bit to indicate that the GbE subsystem 108 now owns the workload descriptor, which permits the GbE subsystem 108 to write new data to the payload buffer associated with that the workload descriptor.

As another example, for a workload descriptor associated with an offloaded audio stream to be rendered by the cAVS subsystem 116, the audio side ownership setter 540 sets the ownership bit to indicate that the cAVS subsystem 116 initially owns the workload descriptor. Once data is written to the workload descriptor by the cAVS subsystem 116, the audio side ownership setter 540 sets the ownership bit to indicate the GbE subsystem 108 owns the workload descriptor. Once data is read from the workload descriptor by the GbE subsystem 108, the ownership bit is set to indicate the cAVS subsystem 116 again owns the workload descriptor. Before attempting to write new data to the workload descriptor, the audio-side ownership checker 542 tests the ownership bit to confirm the cAVS subsystem 116 owns the workload descriptor. Once ownership is confirmed, the cAVS subsystem 116 can write new audio data from the payload buffer associated with the workload descriptor. The audio side ownership setter 540 then sets the ownership bit to indicate that the GbE subsystem 108 now owns the workload descriptor, which permits the GbE subsystem 108 to read the new data from the payload buffer associated with that the workload descriptor.

In the illustrated example of FIG. 5, the audio subsystem IPC transceiver 526 enables the cAVS subsystem 116 to communicate with the GbE subsystem 108 via the IPC interface implemented in the SoC 122. For example, the audio subsystem IPC transceiver 526 is used to communicate ADA offload requests and responses between the cAVS subsystem 116 and the GbE subsystem 108, send messages to the GbE subsystem 108 indicating when the data structure maintained in the DDR memory 112 for a given offloaded audio stream has been updated by the cAVS subsystem 116 and is ready to be accessed by the GbE subsystem 108, receive messages from the GbE subsystem 108 indicating when the data structure maintained in the DDR memory 112 for a given offloaded audio stream has been updated by the GbE subsystem 108 and is ready to be accessed by the cAVS subsystem 116, etc.

Figure 6:
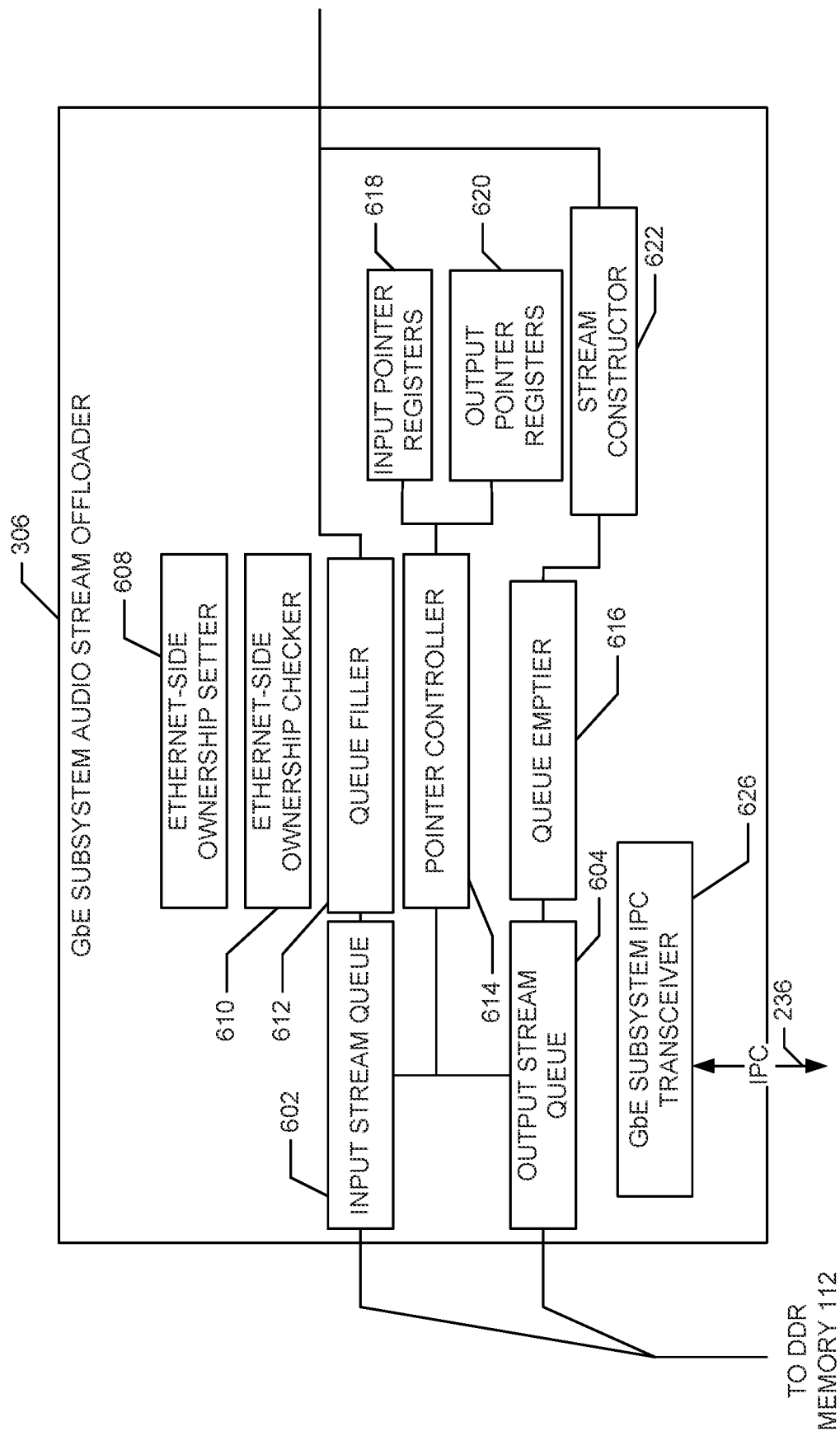
FIG. 6 illustrates a block diagram of an example Ethernet subsystem audio stream offloader included in the example SoC integrated circuit of FIG. 2.

FIG. 6 illustrates an example implementation of the GbE subsystem audio stream offloader 306. The GbE subsystem audio stream offloader 306 of the illustrated example includes an example input stream queue 602, an example output stream queue 604, an example Ethernet-side ownership checker 608, an example Ethernet-side ownership setter 610, an example queue filler 612, an example pointer controller 614, an example queue emptier 616, example input pointer registers 618, example output pointer registers 620, an example stream constructor 622, and an example GbE subsystem IPC transceiver 626, which implement functionality associated with the steering of audio data associated with an audio stream that has been offloaded to a direct hardware path connecting the GbE subsystem 108 and the cAVS subsystem 116.

As described above, the queue designator 412 (see FIG. 4) designates dedicated queues in the GbE subsystem 108 by which audio streams that are transferred between the GbE-side AVB offloader 230 and the example audio-side AVB offloader 232 by way of the example DDR memory 112 (e.g., the dedicated portion 228 of the DDR memory 112) are communicated to/from the Ethernet network of the AVB system 100. In the illustrated example of FIG. 6, the queue designator 412 has designated a first hardware queue in the GbE subsystem 108 to operate as the output stream queue 604 has designated a second hardware queue in the GbE subsystem 108 to operate as an input stream queue 602. The output stream queue 604 is used to transmit an offloaded AVB stream received by the GbE subsystem 108 from the cAVS subsystem 116 via the data structure implementing the direct hardware path in the DDR memory 112 to the Ethernet network of the AVB system 100. The input stream queue 602 is used to transmit an offloaded AVB stream received by the GbE subsystem 108 from the Ethernet network of the AVB system 100 to the cAVS subsystem 116 via the data structure implementing the direct hardware path in the DDR memory 112. Although one input stream queue 602 and one output stream queue 604 are shown in the example of FIG. 6, any number of input stream queues 602 and/or output stream queues 604 may be designated to be used for AVB stream offloading, thereby keeping the AVB traffic separate from the other data traffic being handled by the GbE subsystem 108.

When an offloaded input audio stream for which ADA has been enabled (e.g., as determined by a VLAN tag included in the audio stream packets) is received from an AVB endpoint, such as the endpoint 102, the queue filler 612 causes the received data to be transferred from the input stream buffer 310 (see FIG. 3) to the input stream queue 602. In the illustrated example, when audio stream data is placed into the input stream queue 602, the pointer controller 614 extracts information from the input audio stream data, such as the VLAN tag, endpoint device identifiers, etc. The pointer controller 614 compares the extracted information to the work descriptors generated by the audio-side AVB offloader 232 to identify the circular ring of work descriptors in the DDR memory 112 that correspond to this audio stream.

Next, the pointer controller 614 checks the relevant enqueue pointer generated by the audio-side AVB offloader 232 for that circular ring of work descriptors and stores the pointers as a shadow enqueue pointer in the input pointer registers 618. As described above, the enqueue pointer identifies the most recent payload buffer made available by the audio-side and to which the input stream is to be stored in the DDR memory 112. In the illustrated example, the pointer controller 614 generates a running dequeue pointer stored in the input pointer registers 618 for the input audio stream being processed as input audio data is transferred from the input stream queue 602 to the data structure maintained in the DDR memory 112 for that input audio stream. The dequeue pointer generated by the pointer controller 614 points to the descriptor in the DDR memory 112 identifying the current payload buffer consumed by the GbE subsystem 108 to store the input audio data. The pointer controller 614 may also maintain a last enqueue pointer for the input audio stream, which indicates that last work descriptor in the circular ring that was generated by the cAVS subsystem 116 (e.g., to ensure unprocessed audio data is not overwritten). In the illustrated example, the Ethernet-side ownership checker 610 is used to check the ownership bit of the work descriptor pointed to by the enqueue pointer to confirm the descriptor is owned by the GbE subsystem 108 before the input stream queue 602 transfers data to the work descriptor, and the Ethernet-side ownership setter 608 sets the ownership bit to indicate the descriptor is owned by the cAVS subsystem 116 after the data transfer is complete.

In the case of an offloaded output audio stream for which ADA and that is to be transmitted from the cAVS subsystem 116 for rendering at an AVB endpoint, such as the endpoint 102, the pointer controller 614 identifies the circular ring of work descriptors in the DDR memory 112 that correspond to that output audio stream. The pointer controller 614 then checks the relevant enqueue pointer generated by the audio-side AVB offloader 232 for that circular ring of work descriptors and stores the pointer as a shadow enqueue pointer in the output pointer registers 620. As described above, the enqueue pointer identifies the most recent payload buffer to which the output stream is to be stored in the DDR memory 112. In the illustrated example, the pointer controller 614 generates a running dequeue pointer stored in the output pointer registers 620 for the output audio stream being processed and configures the output stream queue 604 with the generated dequeue pointer. The dequeue pointer generated by the pointer controller 614 points to the descriptor in the DDR memory 112 identifying the current payload buffer to be consumed by the GbE subsystem 108 to read the output audio data. Configuring the output stream queue 604 with the dequeue pointer causes the output stream queue 604 to access the work descriptor in the corresponding data structure maintained in the DDR memory 112 for this audio stream which is pointed to by the dequeue pointer, and then read the audio data from the payload buffer identified by that work descriptor.

The pointer controller 614 may also maintain a last enqueue pointer for the output audio stream, which indicates that last work descriptor in the circular ring that was processed by the cAVS subsystem 116 (e.g., to ensure the output stream queue 604 does not read past the last valid data). In the illustrated example, the Ethernet-side ownership checker 610 is used to check the ownership bit of the work descriptor pointed to by the dequeue pointer to confirm the descriptor is owned by the GbE subsystem 108 before the output stream queue 604 reads data from the work descriptor, and the Ethernet-side ownership setter 608 sets the ownership bit to indicate the descriptor is owned by the cAVS subsystem 116 after the data transfer is complete.

The example GbE subsystem audio stream offloader 306 of FIG. 6 includes the queue emptier 616 to cause the audio data to be read from the output stream queue 604 and provided to the stream constructor 622. The stream constructor 622 formats the audio data to create an AVB-compliant audio data stream to be transmitted to the associated AVB endpoint, such as the endpoint 102, for rendering.

In the illustrated example of FIG. 6, the GbE subsystem IPC transceiver 626 enables the GbE subsystem 108 to communicate with the cAVS subsystem 116 via the IPC interface implemented in the SoC 122. For example, the GbE subsystem IPC transceiver 626 is used to communicate ADA offload requests and responses between the GbE subsystem 108 and the cAVS subsystem 116, send messages to the cAVS subsystem 116 indicating when and where the data structure maintained in the DDR memory 112 for a given offloaded audio stream has been updated by the GbE subsystem 108 and is ready to be accessed by the cAVS subsystem 116, receive messages from the cAVS subsystem 116 indicating when the data structure maintained in the DDR memory 112 for a given offloaded audio stream has been updated by the cAVS subsystem 116 and is ready to be accessed by the GbE subsystem 108, etc.

Figure 7:
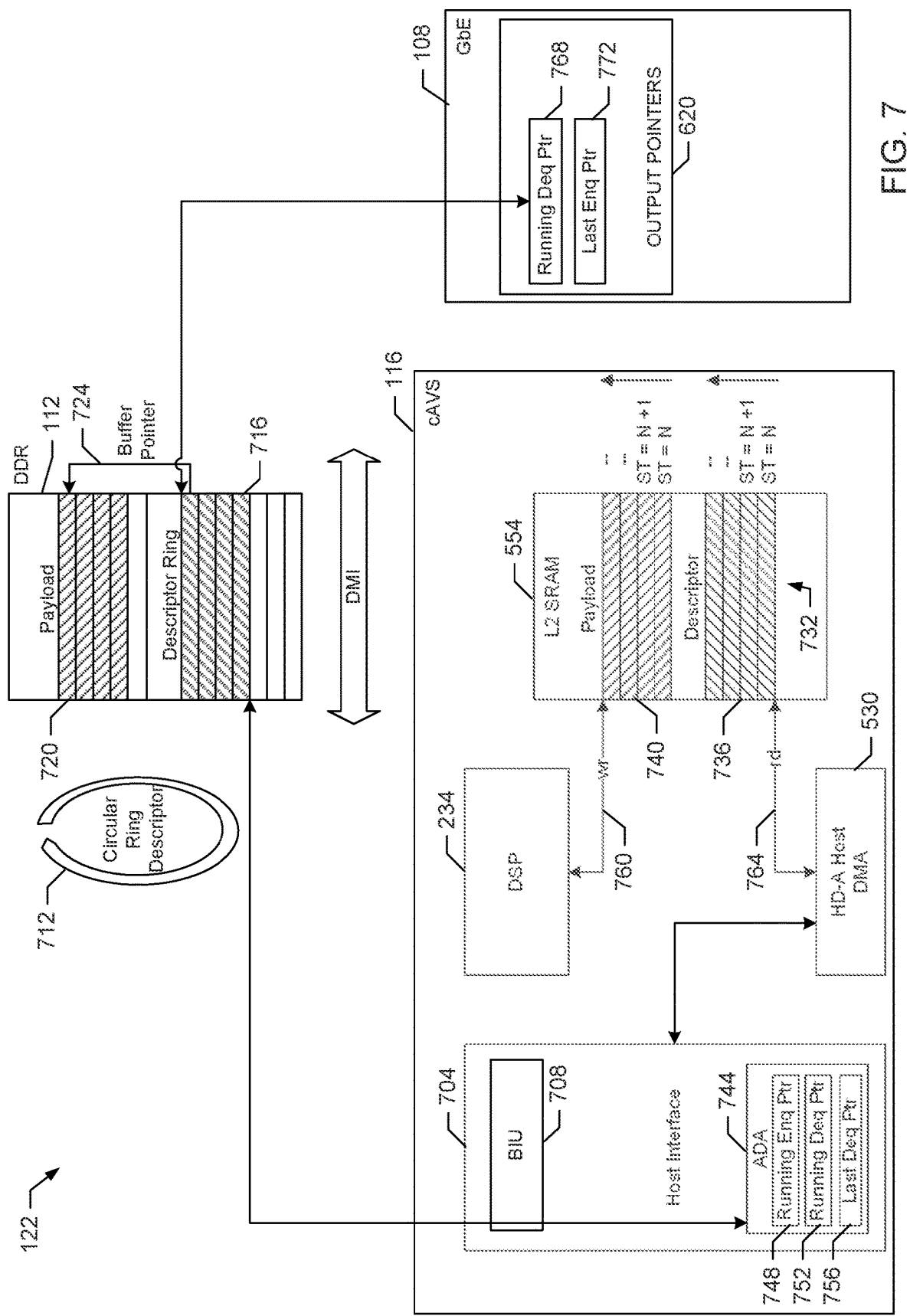
FIG. 7 illustrates an example configuration of the example SoC integrated circuit of FIG. 2 to process an audio stream that is to be rendered at a remote audio endpoint.

FIG. 7 illustrates an example configuration of the SoC 122 to process an audio stream that is to be rendered at a remote audio endpoint, such as the endpoint 102. In the example of FIG. 7, the ADA feature has been enabled for the audio stream and, thus, the audio stream has offloaded to a direct hardware path for communication between the GbE subsystem 108 and the cAVS subsystem 116. In the illustrated example, the GbE subsystem 108, the cAVS subsystem 116 and the DDR memory 112 of the SoC 122 are shown. Furthermore, in the illustrated example, the DSP 234, the DMA controller 530 and the local memory 554 of the cAVS subsystem 116 are shown. In the example of FIG. 7, the cAVS subsystem 116 also includes an example host interface 704 including an example bus interface unit 708 that provides access to the DDR memory 112.

In the example of FIG. 7, an audio stream (e.g., such as pulse code modulated (PCM) data) is rendered from the SoC 122 to the AVB endpoint device 102. Because ADA is enabled for the audio stream, the DSP 234 acts as a proxy for the AVB driver 110 controlling the transmission of the audio stream to endpoint device 102. In the illustrated example, the audio-side AVB offloader 232 has already prepared, as described above, an example AVB data structure 712 in the DDR memory 112 for the audio stream. As described above, the AVB data structure 712 includes an example circular ring of work descriptors 716 and an associated example payload section 720, with each work descriptor including a respective example pointer 724 that points to a respective payload buffer included in the payload section. In some examples, each audio stream being processed by the SoC 122 includes a respective AVB data structure 712 with a corresponding circular ring of work descriptors 716 and associated example payload section 720. To simplify the AVB data structure interface, the payload buffers associated with the descriptors are configured as a contiguous memory region to avoid scatter-gather complexity.

In the illustrated example, the audio-side AVB offloader 232 has also already prepared an example local AVB data structure 732 in the local memory 554 (illustrated as an L2 SRAM). The local AVB data structure 732 includes an example circular ring of work descriptors 736 and an associated example payload section 740 that mirrors the AVB data structure 712 in the DDR memory 112. In the illustrated example, the audio-side AVB offloader 232 has further prepared example AVB pointers 744 to manage access to the AVB data structures 712 and 732 by the cAVS subsystem 116. For example, the pointers 744 include an example running enqueue pointer 748 generated by the audio-side AVB offloader 232, and an example running dequeue pointer 752 and an example last dequeue pointer 756, which correspond to shadowed versions of the corresponding pointers generated by the GbE subsystem 108.

In operation, the DSP 234 prepares the descriptors and associated payload buffers in the local AVB data structure 732 in accordance with the AVB protocol, and then arms the DMA controller 530 (represented by line 760 in FIG. 7.) The DMA controller 530 than transfers the prepared portions of the local AVB data structure 732 to the corresponding AVB data structure 712 in the DDR memory 112 (represented by line 764 in FIG. 7.) In the illustrated example of FIG. 7, the DMA controller 530 uses the AVB pointers 744, which are updated by the DSP 234, to control which descriptor(s) and associated payload buffer(s) are transferred from the local AVB data structure 732 to the corresponding AVB data structure 712. In some examples, the DSP 234 also checks and sets the ownership bit(s) of the descriptor(s), as described above.

Once the DMA transfer is complete, the DSP 234 sends an IPC message to the GbE subsystem 108, which triggers the GbE subsystem 108 to start processing the audio stream's AVB data structure 712 in the DDR memory 112. In the illustrated example of FIG. 7, the GbE subsystem 108 has generated an example running dequeue pointer 768 and also checked an example last enqueue pointer 772 that has been prepared by the audio-side AVB offloader 232 for this audio stream and stored the pointers in the output pointer registers 620. The GbE subsystem 108 uses the running dequeue pointer 768 and the last enqueue pointer 772 to read the work descriptor and then the corresponding audio data for the audio stream from the AVB data structure 712. In some examples, the GbE subsystem 108 also checks and sets the ownership bit(s) of the descriptor(s), as described above.

The GbE subsystem 108 then fetches and processes the descriptors from the AVB data structure 712, accesses the payload of the AVB data structure 712 using direct memory addressing, and transmits the audio stream as Ethernet packets on the Ethernet network of the AVB system 100 to the endpoint 102.

Figure 8:
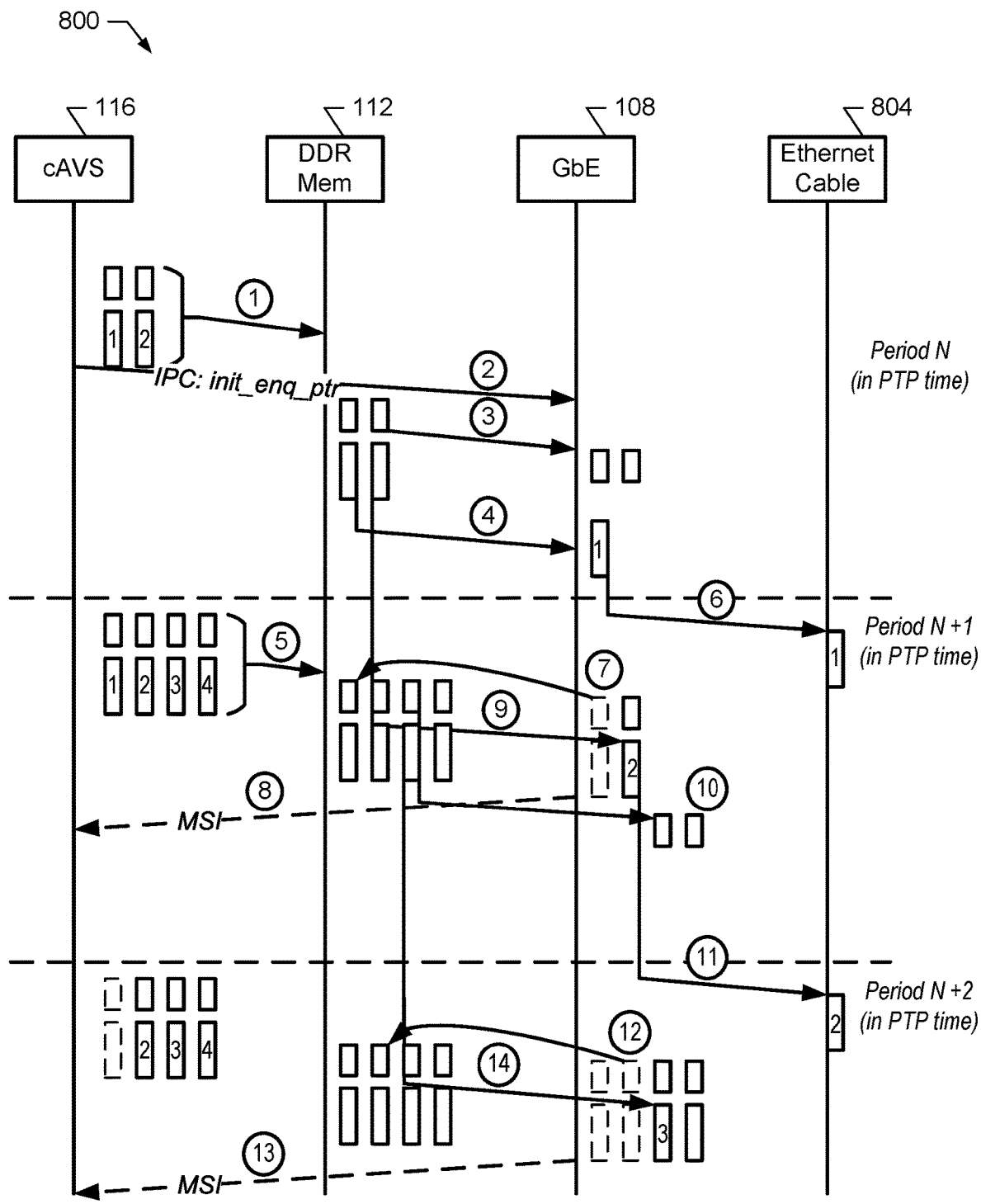
FIGS. 8, 9, 12 and 13 depict example sequence diagrams that further illustrate operation of the example SoC integrated circuit of FIG. 2.

FIG. 8 depicts an example sequence diagram 800 that further illustrates example operation of the SoC 122 of FIG. 7 to output an ADA offloaded audio stream to an AVB endpoint device, such as the endpoint 102. The example sequence diagram 800 of FIG. 8 illustrates operation of the cAVS subsystem 116, the DDR memory 112 and the GbE subsystem 108 of the SoC 122 to output the audio packets for the offloaded audio stream on the Ethernet network of the AVB system 100, which is labeled as the Ethernet network 804 in FIG. 8. In the illustrated example of FIG. 8, a maximum number of work descriptors and a threshold descriptor count for the given output audio stream are configurable. For example, in the sequence diagram 800, the number work descriptors for the audio stream has been set to 4, and the maximum count of the threshold descriptor count is less than or equal to 2 work descriptors.

To process an audio stream to be rendered at the AVB endpoint device 102, the example sequence diagram 800 begins at the operation labeled 1 of FIG. 8 at which the DSP 234 of the cAVS subsystem 116 prepares an initial set of two work descriptors for the audio stream, and also prepares the payload to be rendered for the period interval (e.g., 125 us). In addition, the DSP 234 of the cAVS subsystem 116 may perform post-processing on the audio stream to be rendered. After any such post-processing is completed, the DSP 234 of the cAVS subsystem 116 sets up a DMA buffer in the local memory 554 and then arms the DMA controller 530 to transfer the two initial descriptors and associated payload to the allocated region in the DDR memory 112 (e.g., such as the region 228).

Next, at the operation labeled 2 of FIG. 8, the DSP 234 of the cAVS subsystem 116 sends an IPC command containing an initial enqueue descriptor pointer (referred to herein as INIT_ENQ_PTR) to the GbE subsystem 108. The GbE subsystem 108 responds to the INIT_ENQ_PTR by checking the ownership bit of the associated workload descriptor addressed by the INIT_ENQ_PTR. Provided that the descriptor is validated by the check of the ownership bit as being owned by the GbE subsystem 108, the GbE subsystem 108 uses the pointer to fetch the first descriptor for the stream to be rendered. In the illustrated example, the IPC command is sent via the IPC interface 236 connecting cAVS subsystem 116 and accepted by the GbE subsystem 108.

At the operation labeled 3 of FIG. 8, based on the configuration of the GbE subsystem 108 for descriptor prefetch, the GbE subsystem 108 uses direct memory access to one or more descriptors for processing. In some examples, internal Ethernet bandwidth allocation and schedule management is performed by the GbE subsystem 108. In some such examples, the GbE subsystem 108 processes the current work descriptor (in this case the first descriptor) and gets its payload buffer pointer address.

At the operation labeled 4 of FIG. 8, the GbE subsystem 108 uses the payload buffer address contained in the current work descriptor to fetch the payload from system memory.

At the operation labeled 5 of FIG. 8, when the cAVS schedule time (e.g., 1 ms. or 0.33 ms. for ultra-low latency scheduling) elapses, the DSP 234 of the cAVS subsystem 116 prepares more descriptors and payloads, which are again stored in a shared region of the DDR memory 112. In some examples, DSP 234 of the cAVS subsystem 116 tracks the firmware scheduling and AVB time periods to ensure the number of work descriptors attempted to be processed do not exceed the maximum, and so that the threshold number descriptors are continuously available for the GbE subsystem 108 to process. Note that the cAVS descriptor preparation time may not align with PTP period time.

At the operation labeled 6 of FIG. 8, when the network time matches the current work descriptor (first descriptor) dispatch time, the protocol and link layer send the Ethernet packet onto the physical cable. For transmit packets, the current PTP time is updated in the Ethernet packet when the packet is sent or retried (e.g., either during the initial attempt to send the packet or a later attempt to send the packet after a collision detection).

At the operation labeled 7 of FIG. 8, when the Ethernet packet (associated with the first descriptor) is successfully sent on the Ethernet network, the current work descriptor is updated to release the ownership (OWN) field in the descriptor and descriptor is written back into DDR memory 112, which allows the DSP 234 of the cAVS subsystem 116 to get the descriptor completion update.

For end-to-end low latency, at the operation labeled 8 of FIG. 8, which may be optional in some examples, a peer interrupt is sent from the GbE subsystem 108 to the DSP 234 of the cAVS subsystem 116. The interrupt could be a wired interrupt or a peer vendor-defined interrupt message to the DSP 234. If a peer interrupt is not supported by the SoC 122, the DSP 234 can read the top of the descriptor chain to poll and determine if the descriptor is completed (e.g., to determine whether the OWN field has been released or, in other words, set to indicate the cAVS subsystem 116 is now the owner of the descriptor).

At the operation labeled 9 of FIG. 8, in the same processing period, the GbE subsystem 108 processes the next (e.g., second) work descriptor and fetches the payload for next the PTP period.

At the operation labeled 10 of FIG. 8, based on a number of pre-fetched descriptors, the GbE subsystem 108 may fetch more descriptors. In some examples, the maximum work descriptor does not exceed the configured maximum count to thereby ensure that descriptors are valid and prepared by the cAVS subsystem 116 ahead of time.

At the operation labeled 11 of FIG. 8, when the network time matches the dispatch time of the current work descriptor (e.g., the second work descriptor), the protocol and link layer send the Ethernet packet onto the physical cable.

At the operation labeled 12 of FIG. 8, when the Ethernet packet (associated with the second descriptor) is successfully sent on the Ethernet network, the current work descriptor is updated to release the ownership (OWN) field in the descriptor. The work descriptor is written back in system memory, so the DSP 234 of the cAVS subsystem 116 can get the descriptor completion update.

At the operation labeled 13 of FIG. 8, which may be optional in some examples, an interrupt may be sent from the GbE subsystem 108 to the DSP 234 of the cAVS subsystem 116 for the completed descriptor (second descriptor). If peer interrupt is not supported by SoC 122, the DSP 234. can read the top of descriptor chain to poll and determine if the descriptor is completed (e.g., to determine whether the OWN field has been released or, in other words, set to indicate the cAVS subsystem 116 is now the owner of the descriptor).

At the operation labeled 14 of FIG. 8, in the same processing period, the GbE subsystem 108 will process the next descriptor (third descriptor) and fetch the payload for next PTP period. The subsequent transfers will maintain a periodic cadence on both the cAVS and the GbE side of the SoC 122, while maintaining the active descriptors within the threshold descriptor and maximum work descriptor amount.

Figure 9:
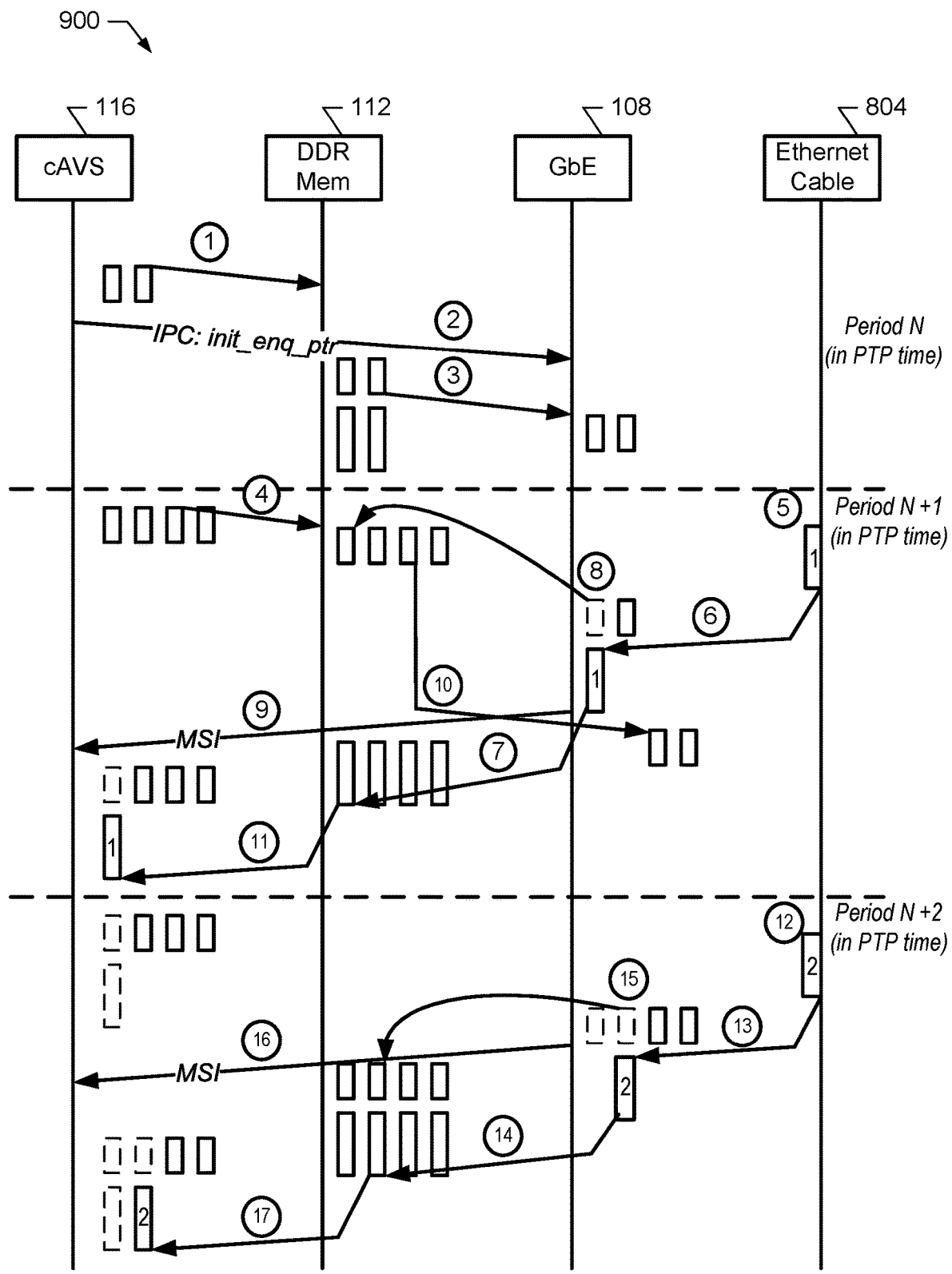

FIG. 9 depicts an example sequence diagram 900 that illustrates example operation of the SoC 122 of FIG. 7 to receive an input ADA offloaded audio stream from an AVB endpoint device, such as the endpoint 102. For example, the AVB endpoint device 102 can include a microphone to capture audio to be processed by the SoC 122. The example sequence diagram 900 of FIG. 9 illustrates operation of the cAVS subsystem 116, the DDR memory 112 and the GbE subsystem 108 of the SoC 122 to receive the audio packets for the offloaded audio stream from the Ethernet network of the AVB system 100, which is labeled as the Ethernet network 804 in FIG. 9. In the illustrated example of FIG. 9, a maximum number of work descriptors and a threshold descriptor count for the given output audio stream are configurable. For example, in the sequence diagram 900, the number work descriptors for the audio stream has been set to 4, and the maximum count of the threshold descriptor count is less than or equal to 2 work descriptors.

To process an audio stream received (e.g., captured) from the AVB endpoint device 102, the example sequence diagram 900 begins at the operation labeled 1 of FIG. 9 at which the DSP 234 of the cAVS subsystem 116 prepares a set of two initial work descriptors, and allocates a payload buffer in the DDR memory 112 for the period interval (e.g., 125 us).

At the operation labeled 2 of FIG. 9, the DSP 234 of the cAVS subsystem 116 sends an IPC command containing an initial enqueue descriptor pointer (referred to herein as INIT_ENQ_PTR) to the GbE subsystem 108. The GbE subsystem 108 uses the initial read pointer to fetch the first descriptor for that stream. The IPC command is sent via the IPC interface 236 connecting cAVS subsystem 116 and accepted by the GbE subsystem 108.

At the operation labeled 3 of FIG. 9, based on the GbE subsystem 108 configuration for descriptor prefetch, the GbE subsystem 108 direct memory accesses one or more descriptors for processing. Additionally, the GbE subsystem 108 allocates the internal Ethernet bandwidth and manages the Ethernet scheduling. The GbE subsystem 108 processes the current work descriptor (in this case the first descriptor) and gets the payload buffer pointer address.

At the operation labeled 4 of FIG. 9, when the cAVS schedule time (1 ms. or 0.33 ms for ultra-low latency scheduling) elapses, the DSP 234 of the cAVS subsystem 116 prepares more descriptors and DMAs them into the DDR memory 112. The DSP 234 of the cAVS subsystem 116 also allocates the payload buffer regions in the DDR memory 112. In some examples, DSP 234 of the cAVS subsystem 116 tracks the firmware scheduling and AVB time periods to ensure the number of work descriptors attempted to be processed do not exceed the maximum, and so that the threshold number descriptors are continuously available for the GbE subsystem 108 to process. Note that the cAVS descriptor preparation time may not align with PTP period time At the operation labeled 5 of FIG. 9, the Ethernet packet (first packet) sent by the AVB endpoint device 102 is received by the GbE subsystem 108. The incoming packets are expected to closely match the network time cadence for the stream period. Because of network collisions, or latency within the AVB endpoint device 102, the current Ethernet packet may be received anywhere within the current period, or may overlap with neighboring periods. However, the AVB endpoint device 102 maintains an overall periodic cadence.

At the operation labeled 6 of FIG. 9, the GbE protocol and link layer receive and store the current Ethernet AVB packet (first packet) in the receive queue (e.g., the input stream queue 602). The GbE subsystem 108 checks the VLAN tag of the packet and performs other Ethernet specific checks before accepting the packet. For receive packets, the PTP time in the received Ethernet AVB packet is forwarded to the cAVS subsystem 116.

At the operation labeled 7 of FIG. 9, the GbE subsystem 108 uses the payload buffer address of the current work descriptor (first descriptor), and DMAs the corresponding payload buffer (first payload buffer) to the DDR memory 112.

At the operation labeled 8 of FIG. 9, when the Ethernet packet (first packet) is successfully received, the current work descriptor is updated to release the ownership (OWN) field in the descriptor (e.g., set the OWN field to indicate the cAVS subsystem 116 is the owner). The work descriptor is written back in the DDR memory 112, which allows the DSP 234 of the cAVS subsystem 116 to get the descriptor completion update.

For end-to-end low latency, at the operation labeled 9 of FIG. 9, which may be optional, in some examples, a peer interrupt is sent from the GbE subsystem 108 to the DSP 234 of the cAVS subsystem 116. The interrupt could be a wire interrupt or a peer vendor-defined interrupt message to DSP 234. If peer interrupt is not supported by the SoC 122, the DSP 234 can read the top of the descriptor chain to poll and determine if the descriptor is completed (e.g., to determine whether the OWN field has been released or, in other words, set to indicate the cAVS subsystem 116 is now the owner of the descriptor).

At the operation labeled 10 of FIG. 9, based on the processing of a number of pre-fetched descriptors, the GbE subsystem 108 may fetch more descriptors. In some examples, the maximum work descriptor does not exceed the configured maximum count to ensure that descriptors are valid and prepared by cAVS subsystem 116 ahead of time.

At the operation labeled 11 of FIG. 9, when a peer interrupt is received or at the next schedule time, the DSP 234 of the cAVS subsystem 116 fetches the current descriptor (first descriptor) and checks the ownership (OWN) field. If the descriptor is complete, the cAVS subsystem 116 will fetch the capture payload from the DDR memory 112. In some examples, the DSP 234 of the cAVS subsystem 116 performs processing on the captured streams.

At the operation labeled 12 of FIG. 9, the next Ethernet packet (second packet) sent by the AVB endpoint device 102 is received by the GbE subsystem 108.

At the operation labeled 13 of FIG. 9, the GbE protocol and link layer receives and stores the current Ethernet AVB packet (second packet) in the receive queue (e.g., the input stream queue 602).

At the operation labeled 14 of FIG. 9, the GbE subsystem 108 uses the payload buffer address of the current work descriptor (second descriptor), and DMAs the corresponding payload buffer (first payload buffer) to the DDR memory 112.

At the operation labeled 15 of FIG. 9, when the Ethernet packet (second packet) is successfully received, the current work descriptor is updated to release the ownership (OWN) field in the descriptor (e.g., set the OWN field to indicate the cAVS subsystem 116 is the owner). The work descriptor is written back in the DDR memory 112, which allows the DSP 234 of the cAVS subsystem 116 to get the descriptor completion update.

At the operation labeled 16 of FIG. 9, which may be optional, in some examples, an interrupt is sent from the GbE subsystem 108 to the DSP 234 of the cAVS subsystem 116 for the completed descriptor (second descriptor). If a peer interrupt is not supported by SoC 122, by default the DSP 234 can read the top of descriptor chain to poll and determine if the descriptor is completed (e.g., the OWN filed is released).

At the operation labeled 17 of FIG. 9, when a peer interrupt is received or at the next schedule time, the DSP 234 of the cAVS subsystem 116 fetches the current descriptor (second) and checks the ownership (OWN) field. If the descriptor is complete, then the cAVS subsystem 116 fetches the capture stream payload from the DDR memory 112. Additionally, the DSP 234 may perform processing on the capture streams. The subsequent transfers maintain a periodic cadence on both the cAVS and the GbE sides of the SoC 122, thereby maintaining the active descriptors within the threshold descriptor count and maximum work descriptor amount.

Figure 10:
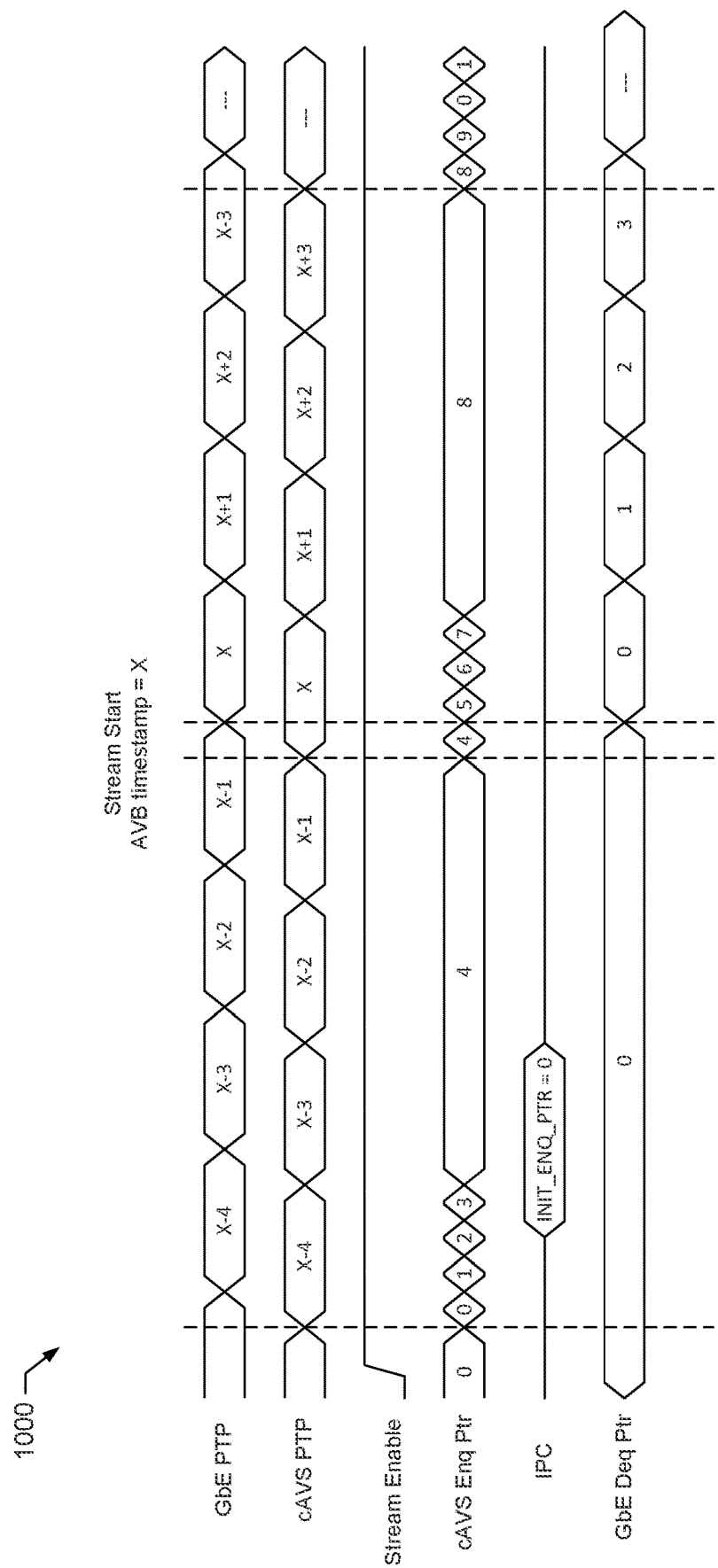
FIGS. 10 and 11 depict example waveforms showing the start and stop of an audio stream flow in the example SoC integrated circuit of FIG. 2.
Figure 11:
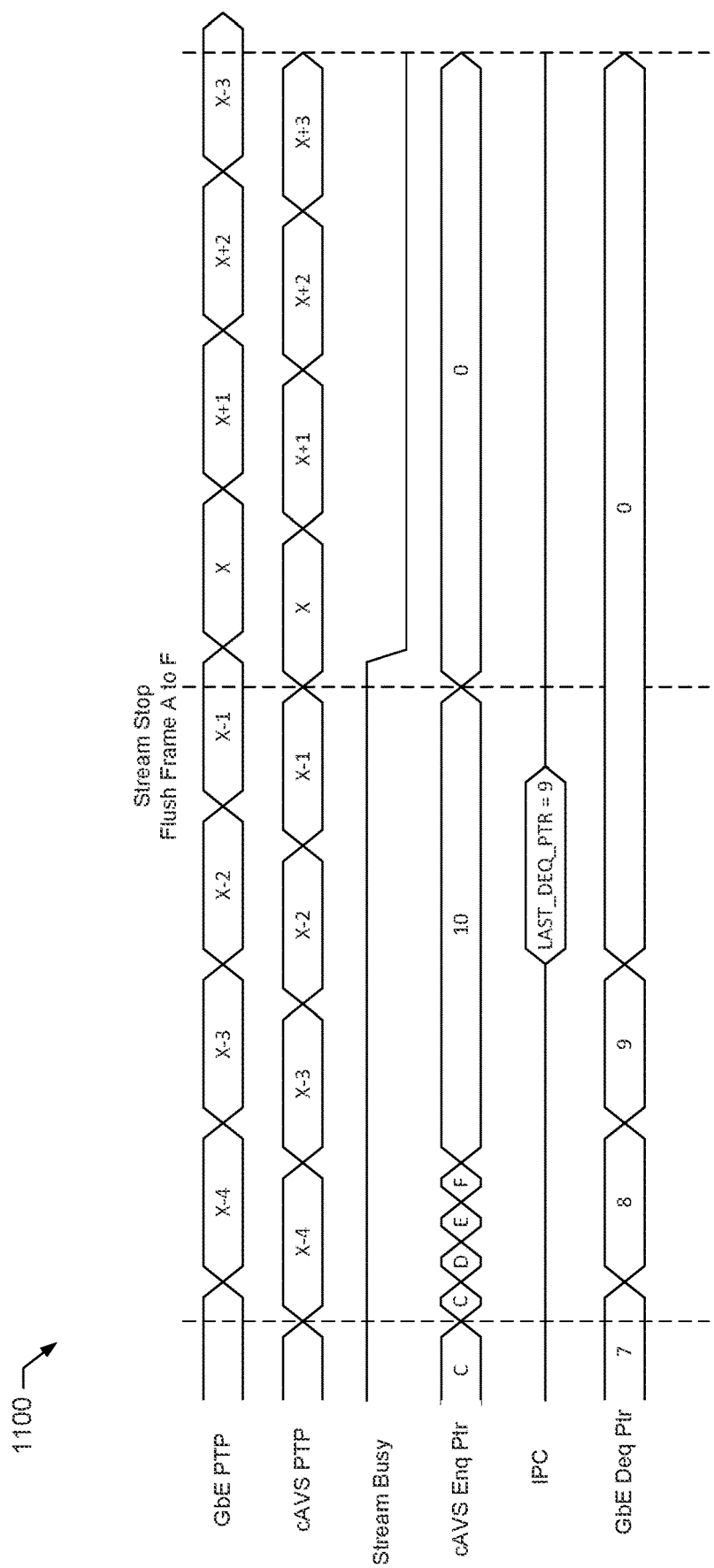

FIGS. 10 and 11 depict example waveforms 1000 and 1100 illustrating starting and stopping, respectively, of an audio stream by the SoC 122 of FIG. 7 across multiple scheduling periods denoted by PTP number. In the illustrated examples of FIGS. 10 and 11, audio output stream operation is executed by rendering a fixed number of audio payload buffers per schedule period. However, there are cases in which the intended audio output stream rate cannot be represented by the fixed integer number of bytes per schedule period, or the audio payload size is to be adjusted based on audio rate information from a media clock source, which may be local or external. For the fractional audio stream rate case, the DSP 234 of the cAVS subsystem 116 performs the averaging and/or padding of additional audio sample block(s), as appropriate.

Figure 12:
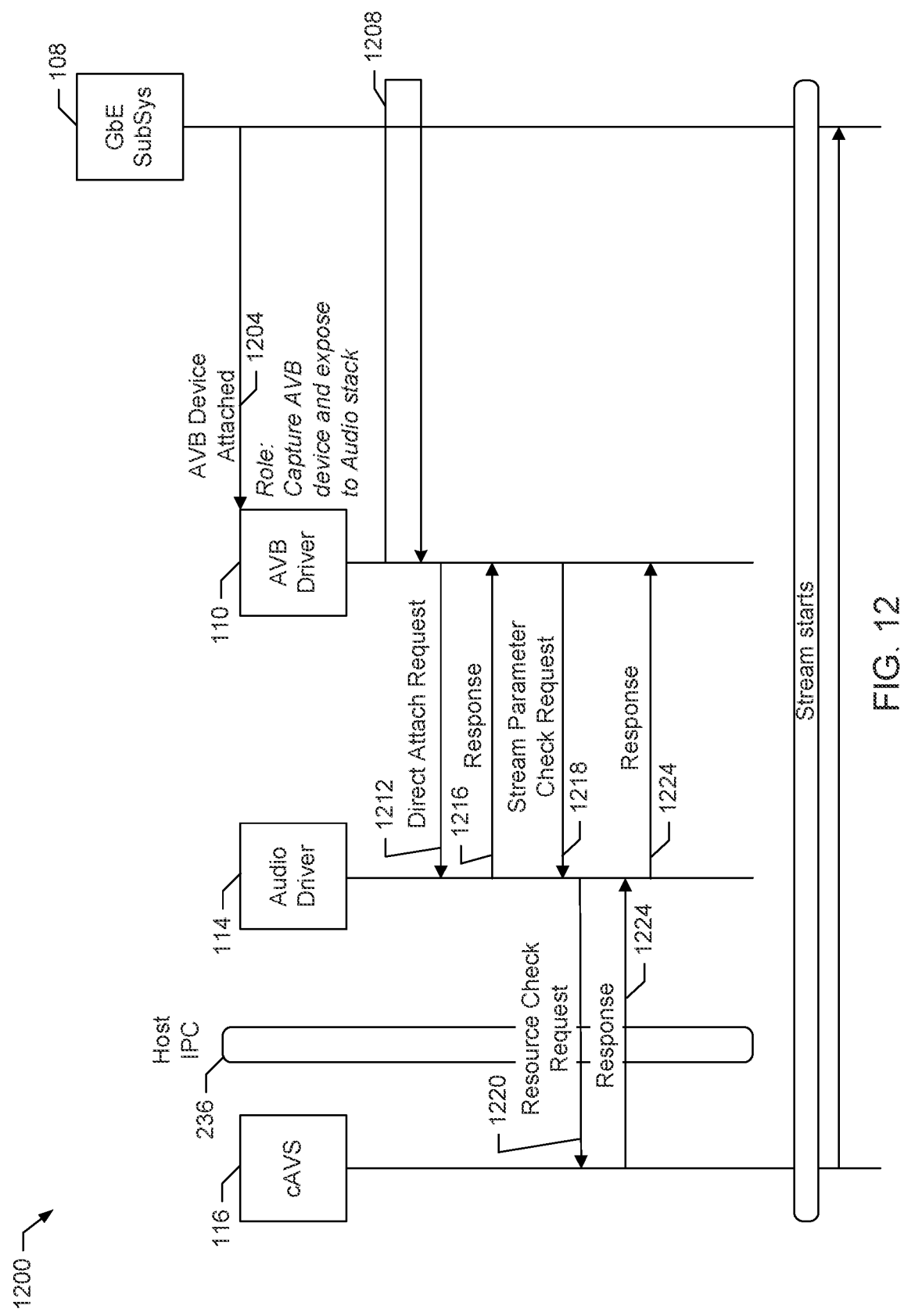

FIG. 12 depicts an example sequence diagram 1200 that illustrates example operation of the SoC 122 of FIG. 7 to setup AVB offloading of an audio stream for which the ADA feature disclosed herein has been enabled. The example sequence diagram 1200 of FIG. 12 illustrates operation of the cAVS subsystem 116, the audio driver 114, the AVB driver 110 and the GbE subsystem 108 of the SoC 122 to offload an audio stream associated an AVB endpoint device, such as the endpoint 102, to a direct hardware path between the cAVS subsystem 116 and the GbE subsystem 108.

The example sequence diagram 1200 of FIG. 12 begins with an example AVB Device Attach operation 1204 at which AVB device connection and enumeration is handled between GbE subsystem 108 and the AVB driver 110. In some examples, the initial ADA offload decision is based on the AVB device type and identifier of the AVB endpoint (e.g., the endpoint 102). In some examples, the initial ADA offload decision is also based on the capabilities of the GbE subsystem 108. Once the decision is made the ADA sequencing moves on to an example GbE subsystem initialization operation 1208.

At the GbE subsystem initialization operation 1208, the AVB driver 110 configures the GbE subsystem 108 to setup the dedicated queues to support the ADA for the audio stream, programs the VLAN tag for transmit and receive pipes, and performs any other resource allocation in DMA and FIFOs to support the ADA feature for the audio stream. The dedicated queue is setup so that the offloaded audio stream traffic is isolated from other Ethernet traffic. In some examples, if the GbE subsystem 108 is limited to performing packet filtering on just VLAN priority, either all streams or no stream of a given traffic class will be allowed to undergo the ADA feature. However, if the GbE subsystem 108 has more flexible filtering (e.g., based on stream_id or DMAC address), then the ADA feature can be applied to individual audio streams.

Next, at an example AVB Direct Attach Request operation 1212, which occurs after the initial offload decision and configuration is done on Ethernet-side of the SoC 122, the AVB driver 110 sends an offload request to audio driver 114. This offload request is used is to discover ADA feature support of cAVS subsystem 116 and to make a final decision as to whether to offload the AVB audio stream to a direct hardware path in accordance with the ADA feature, or to pass the audio stream to regular software-based path.

Next, an example AVB Direct Attach Response operation 1216 occurs, which is the response phase of the ADA request from GbE subsystem 108. At this operation phase, the audio driver 114 performs high level checks on the AVB direct attach capabilities in the cAVS subsystem 116 and, based on this check, returns a response to accept or reject the initial ADA offload request. In some examples, this is a preliminary response to accept or reject the initial ADA offload request.

Next, an example Stream Parameter Check Request operation 1218 and an example Resource Check Request operation 1220 occurs, through which the AVB driver 110 and the audio driver 114 exchange the stream parameters from GbE subsystem 108 to the cAVS subsystem 116, and cross check the hardware and firmware resources in the cAVS subsystem 116 to support the requested stream. Example resource checks include, but are not limited to, firmware module availability, DMA channel availability, internal bandwidth allocation, etc.

Next, an example Resource Check Response operation 1224 occurs. Based on the resource check performed at operation 1220, the response to the stream parameter check is sent back to the AVB driver 110. In some examples, this step is the final check before starting the audio stream. In some examples, the response could be accept or reject. In the case of a reject response, the AVB audio stream will not be offloaded to a direct hardware path between the GbE subsystem 108 and the cAVS subsystem 116 and, thus, the audio stream will pass the stream through a conventional software-based path between the GbE subsystem 108 and the cAVS subsystem 116. However, in the case of an accept response, the AVB audio stream will be offloaded to a direct hardware path between the GbE subsystem 108 and the cAVS subsystem 116.

In some examples, the stream parameter check request and response phases will be repeated for all streams associated with a given AVB endpoint device. There could one or more streams associated with the attached AVB endpoint device, which start and stop independently. There may also be one or more AVB endpoint devices connected to the AVB system 100, and the AVB endpoint devices may be attached to cAVS subsystem 116 and share the same transmit and receive pipes, but use respective stream_id parameters (and/or other AVBIDs, as described above) to identify the respective audio stream traffic.

Figure 13:
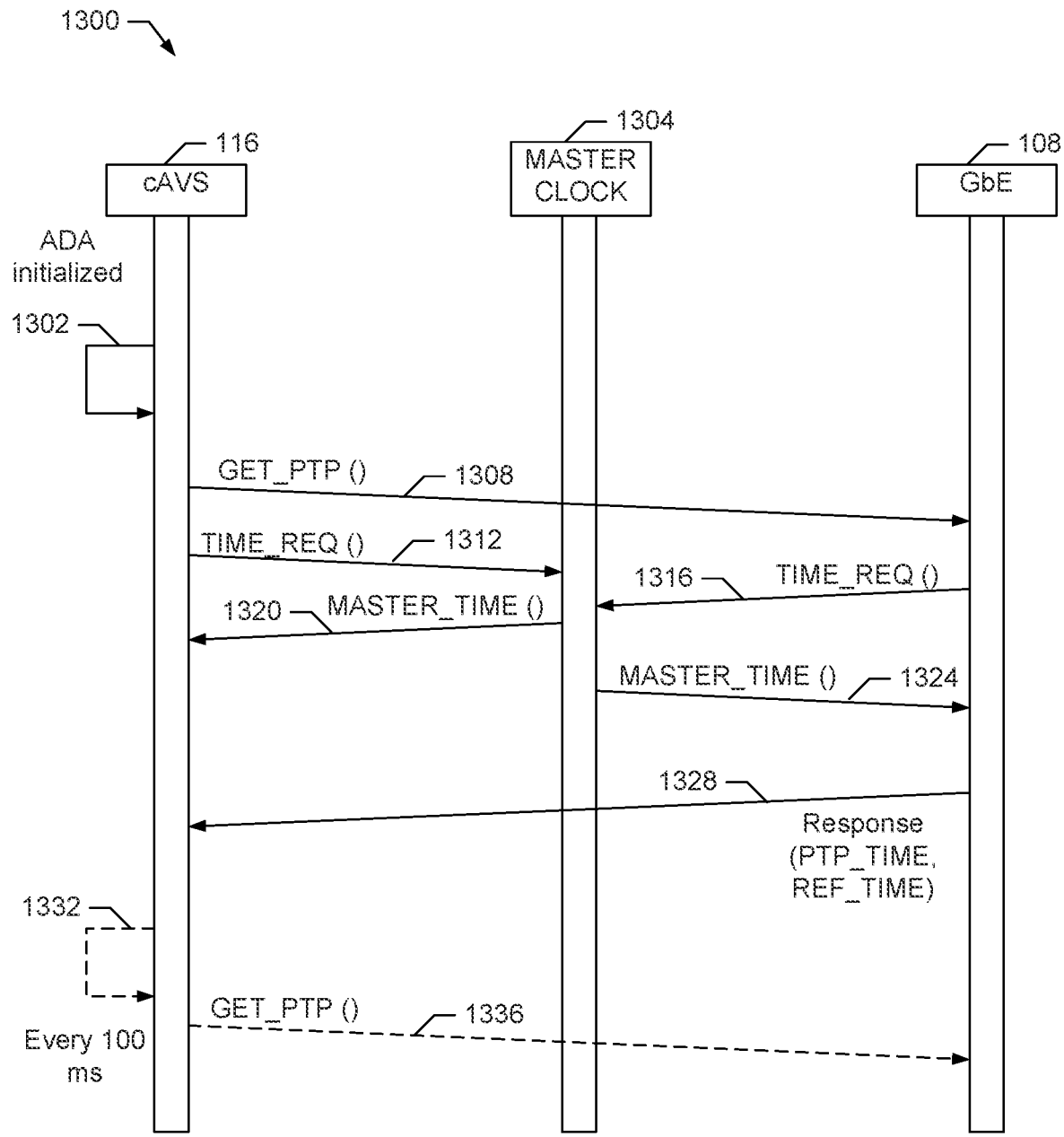

FIG. 13 depicts an example sequence diagram 1300 that illustrates example operation of the SoC 122 of FIG. 7 to perform PTP time synchronization between the GbE subsystem 108 and the cAVS subsystem 116 of the SoC 122. The example sequence diagram 1200 of FIG. 12 illustrates operation of the GbE subsystem 108, the cAVS subsystem 116 and an example master clock 1304 to perform PTP time synchronization. The master clock 1304 is included in the SoC 122 to provide a master clock reference for elements of the SoC 122, such as the GbE subsystem 108 and the cAVS subsystem 116. For example, the master clock 1304 can be implemented by an always running timer (ART), a master timer, etc. In contrast, the PTP master clock to support PTP in accordance with the AVB protocol may be implemented by an external device, such as a remote endpoint device, and tracked by the GbE system 108 as a local PTP timer, or may be implemented in the GbE subsystem 108 of the SoC 122 itself.

Precision time protocol (PTP) is the time synchronization service used in an Ethernet AVB network, such as the AVB system 100. In the illustrated example of FIG. 13, PTP time is handled by the GbE subsystem 108. The cAVS subsystem 116 maintain a shadow copy of the PTP time and performs periodic (and/or aperiodic) time synchronization with GbE subsystem's PTP time. Such time synchronization is performed if the cAVS subsystem 116 and the GbE subsystem 108 have different timer reference clocks, which will introduce clock drift as time progress.

To ensure smooth communication, the PTP time is synchronized with the GbE subsystem 108. The PTP timer maintained by the GbE subsystem 108 (e.g., and based on an external master PTP timing source, in some examples) is shadowed in the cAVS subsystem 116 during initialization and synchronized over time if the reference clocks between the GbE subsystem 108 and the cAVS subsystem 116 are different. PTP time synchronization enables accurate timestamping of the AVB packets. Additionally, the cAVS subsystem 116 uses the PTP time included as a timestamp in the AVB audio packet to measure the stream frequency of the capture stream. PTP time synchronization is also used by the cAVS subsystem 116 to maintain a periodic schedule for the transmit and receive pipelines between the cAVS subsystem 116 and the GbE subsystem 108. PTP time synchronization is also used to maintain a reliable threshold amount of DDR payload buffers between the cAVS subsystem 116 and the GbE subsystem 108 and avoid overflow or underflow of the AVB descriptors. The cAVS subsystem 116 corrects drift in the PTP time between the cAVS subsystem 116 and the GbE subsystem 108 by initiating a "get_ptp" IPC command at a regular (or irregular) interval, as shown in the example of FIG. 13.

Turning to FIG. 13, once the audio stream has been offloaded for ADA processing as disclosed herein (corresponding to operation 1302 of FIG. 13), the cAVS subsystem 116 sends a "getptp" IPC command to the GbE subsystem 108 via the IPC interface 236 (corresponding to operation 1308 of FIG. 13). Sending the getptp command triggers the cAVS subsystem 116 and the GbE subsystem 108 to perform respective example time request operations 1312 and 1316 with the master clock 1304. When the time request operations 1312 and 1316 complete, master clock times are returned to the cAVS subsystem 116 and the GbE subsystem 108 via respective operations 1320 and 1324. Furthermore, when the time request operation 1324 completes at the GbE subsystem 108, the GbE subsystem 108 returns a "getptp response" IPC command to the GbE subsystem 108 via the IPC interface 236 (corresponding to operation 1328 of FIG. 13), which contains both the master clock time obtained at the GbE subsystem 108 and PTP time maintained at the GbE subsystem 108. The cAVS subsystem 116 then initializes its PTP shadow timer using a three-way time correlation between the master time obtained at the cAVS subsystem 116, the actual GbE subsystem's PTP time, and an offset between the master time and a local timer maintained by the cAVS subsystem 116. If the reference clock for the PTP timer in the GbE subsystem 108 and the PTP shadow timer in the cAVS subsystem 116 are driven by different reference clocks, then the cAVS subsystem 116 triggers a PTP time sync at a periodic (or aperiodic) time intervals (represented by operations 1332 and 1336 in FIG. 13) so that the shadow timer in the cAVS subsystem 116 remains within an accuracy tolerance of the PTP timer maintained by the GbE subsystem 108.

As described above in connection with FIGS. 5 and 6, in the illustrated example implementation of the SoC 122, the cAVS subsystem 116 includes the audio subsystem IPC transceiver 526 to communicate with the GbE subsystem 108 via the IPC interface 236, and the GbE subsystem 108 includes the GbE subsystem IPC transceiver 626 to communicate with the cAVS subsystem 116 via the IPC interface 236. As such, the audio subsystem IPC transceiver 526 provides a control interface for the cAVS subsystem 116 to communicate with the GbE subsystem 108, and the GbE subsystem IPC transceiver 626 provides a control interface for the GbE subsystem 108 to communicate with the cAVS subsystem 116. In some examples, the IPC interface 236 is implemented via an internal fabric of the SoC 122. The control and setup access for communication via the IPC interface 236 are typically infrequent or occur during initialization time, such that the latency associated with the IPC messages are not critical.

Example IPC commands supported by the cAVS subsystem 116 and the GbE subsystem 108 include the following. For example, the cAVS subsystem 116 can use an IPC command to request the PTP time for use in synchronizing the shadow timer of the cAVS subsystem 116 (e.g., an IPC command called "get_ptp"). The cAVS subsystem 116 can also use an IPC command to send an initial read descriptor pointer (e.g., an IPC command called "init_enq_ptr"). The GbE subsystem 108 can use an IPC command to send the last read descriptor pointer to handle exceptions (e.g., an IPC command called "last_deq_ptr"). The cAVS subsystem 116 can also use an IPC command to send a generic get/set command to write/read registers of the GbE subsystem 108 (e.g., an IPC command called "gen_cmd"). The GbE subsystem 108 can use an IPC command to request the running write descriptor pointer (e.g., an IPC command called "cur_enqptr"). The cAVS subsystem 116 can also use an IPC command to request a running read descriptor pointer (e.g., an IPC command called "cur_deqptr"). The GbE subsystem 108 can also use an IPC command to re-pull the PTP time (e.g., an IPC command called "resyncptp"). The GbE subsystem 108 can also use an IPC command to send an interrupt to indicate that the current descriptor processing is complete (e.g., an IPC command called "gbe_intr").

In some example implementations of the SoC 122, there is no restriction on the number of streams supported per AVB endpoint device, or per VLAN tag, which might include one or more AVB endpoint devices. For an audio stream, the SoC 122 may restrict the Ethernet max packet size to be in a payload range of 64-1500 Bytes. In some example, the SoC 122 can start and stop audio streams at any time irrespective of other active and inactive audio streams. In some examples, some or all streams to be rendered by the SoC 122 (or, in other words, output by the SoC 122) use a same transmit VLAN tag and share an output (transmit) queue in the GbE subsystem 108. In some examples, some or all streams to be captured by the SoC 122 (or, in other words, input to the SoC 122) use a same receive VLAN tag and share an input (receive) queue in the GbE subsystem 108. In some examples, the descriptor chain of the AVB data structure implemented in the DDR memory 112 is assumed to be a simple ring descriptor chain. In some such example, the respective payload buffer associated with each descriptor is contiguous with single data buffer pointer, and is not a scatter-gather implementation. In some examples, the PTP network time is owned by the GbE subsystem 108, and the cAVS subsystem 116 maintains a shadow copy of the PTP network time that is time synchronized. The PTP times maintained by the cAVS subsystem 116 and the GbE subsystem 108 track each other, either by using the same reference clock, or periodically through time synchronization, as described above. In some examples, a "threshold descriptor" count is maintained in the DDR memory 112, which can help achieve end-to-end low latency. In some examples, a "work descriptor" count is managed by the SoC 122 to be greater than or equal to a prefetch configuration of the GbE subsystem 108.

While an example manner of implementing the SoC 122 is illustrated in FIGS. 1-13, one or more of the elements, processes and/or devices illustrated in FIGS. 1-13 may be combined, divided, re-arranged, omitted, eliminated and/or implemented in any other way. Further, the example GbE subsystem 108, the example AVB driver 110, the example DDR memory 112, the example audio driver 114, the example cAVS subsystem 116, the example Ethernet-side AVB offloader 230, the example audio-side AVB offloader 232, the example IPC interface 236, the example AVB driver audio stream offloader 302, the example AVB driver non-offload stream handler 304, the example GbE subsystem audio stream offloader 306, the example GbE non-offload stream handler 308, the example input stream buffer 310, the example stream analyzer 312, the example endpoint device handler 314, the example endpoint discoverer and enumerator 404, the example parameter exchanger 406, the example offload requester 408, the example stream connector 410, the example queue designator 412, the example offload decider 414, the example VLAN tag assignor 416, the example local memory 418, the example synchronizer 422, the example audio subsystem IPC transceiver 526, the example descriptor generator 528, the example DMA controller 530, the example pointer controller 534, the example audio-side ownership setter 540, the example audio-side ownership checker 542, the example memory allocator 546, the example offload request response generator 548, the example feature checker 550, the example data structure builder 552, the example audio-side local memory 554, the example input stream queue 602, the example output stream queue 604, the example Ethernet-side ownership checker 608, the example Ethernet-side ownership setter 610, the example queue filler 612, the example pointer controller 614, the example queue emptier 616, the example input pointer registers 618, the example output pointer registers 620, the example stream constructor 622, the example GbE subsystem IPC transceiver 626, the example host interface 704, the example bus interface unit 708, the example clock 1305 and/or, more generally, the example SoC 122 of FIGS. 1-13 may be implemented by hardware, software, firmware and/or any combination of hardware, software and/or firmware. Thus, for example, any of the example GbE subsystem 108, the example AVB driver 110, the example DDR memory 112, the example audio driver 114, the example cAVS subsystem 116, the example Ethernet-side AVB offloader 230, the example audio-side AVB offloader 232, the example IPC interface 236, the example AVB driver audio stream offloader 302, the example AVB driver non-offload stream handler 304, the example GbE subsystem audio stream offloader 306, the example GbE non-offload stream handler 308, the example input stream buffer 310, the example stream analyzer 312, the example endpoint device handler 314, the example endpoint discoverer and enumerator 404, the example parameter exchanger 406, the example offload requester 408, the example stream connector 410, the example queue designator 412, the example offload decider 414, the example VLAN tag assignor 416, the example local memory 418, the example synchronizer 422, the example audio subsystem IPC transceiver 526, the example descriptor generator 528, the example DMA controller 530, the example pointer controller 534, the example audio-side ownership setter 540, the example audio-side ownership checker 542, the example memory allocator 546, the example offload request response generator 548, the example feature checker 550, the example data structure builder 552, the example audio-side local memory 554, the example input stream queue 602, the example output stream queue 604, the example Ethernet-side ownership checker 608, the example Ethernet-side ownership setter 610, the example queue filler 612, the example pointer controller 614, the example queue emptier 616, the example input pointer registers 618, the example output pointer registers 620, the example stream constructor 622, the example GbE subsystem IPC transceiver 626, the example host interface 704, the example bus interface unit 708, the example clock 1305 and/or, more generally, the example SoC 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example SoC 122, GbE subsystem 108, the example AVB driver 110, the example DDR memory 112, the example audio driver 114, the example cAVS subsystem 116, the example Ethernet-side AVB offloader 230, the example audio-side AVB offloader 232, the example IPC interface 236, the example AVB driver audio stream offloader 302, the example AVB driver non-offload stream handler 304, the example GbE subsystem audio stream offloader 306, the example GbE non-offload stream handler 308, the example input stream buffer 310, the example stream analyzer 312, the example endpoint device handler 314, the example endpoint discoverer and enumerator 404, the example parameter exchanger 406, the example offload requester 408, the example stream connector 410, the example queue designator 412, the example offload decider 414, the example VLAN tag assignor 416, the example local memory 418, the example synchronizer 422, the example audio subsystem IPC transceiver 526, the example descriptor generator 528, the example DMA controller 530, the example pointer controller 534, the example audio-side ownership setter 540, the example audio-side ownership checker 542, the example memory allocator 546, the example offload request response generator 548, the example feature checker 550, the example data structure builder 552, the example audio-side local memory 554, the example input stream queue 602, the example output stream queue 604, the example Ethernet-side ownership checker 608, the example Ethernet-side ownership setter 610, the example queue filler 612, the example pointer controller 614, the example queue emptier 616, the example input pointer registers 618, the example output pointer registers 620, the example stream constructor 622, the example GbE subsystem IPC transceiver 626, the example host interface 704, the example bus interface unit 708 and/or the example clock 1305 is/are hereby expressly defined to include a non-transitory computer readable storage device or storage disk such as a memory, a digital versatile disk (DVD), a compact disk (CD), a Blu-ray disk, etc. including the software and/or firmware. Further still, the example SoC 122 may include one or more elements, processes and/or devices in addition to, or instead of, those illustrated in FIGS. 1-13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Sequence diagrams and a flowchart representative of example hardware logic, machine readable instructions, hardware implemented state machines, and/or any combination thereof for implementing the SoC 122 are shown in FIGS. 8, 9, 12, 13 and 14. In a machine readable instruction implementation, the machine readable instructions may be one or more executable programs or portion(s) of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the sequence diagrams and flowchart illustrated in FIGS. 8, 9, 12, 13 and 14, many other methods of implementing the example SoC 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc., in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 8, 9, 12, 13 and 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 14:
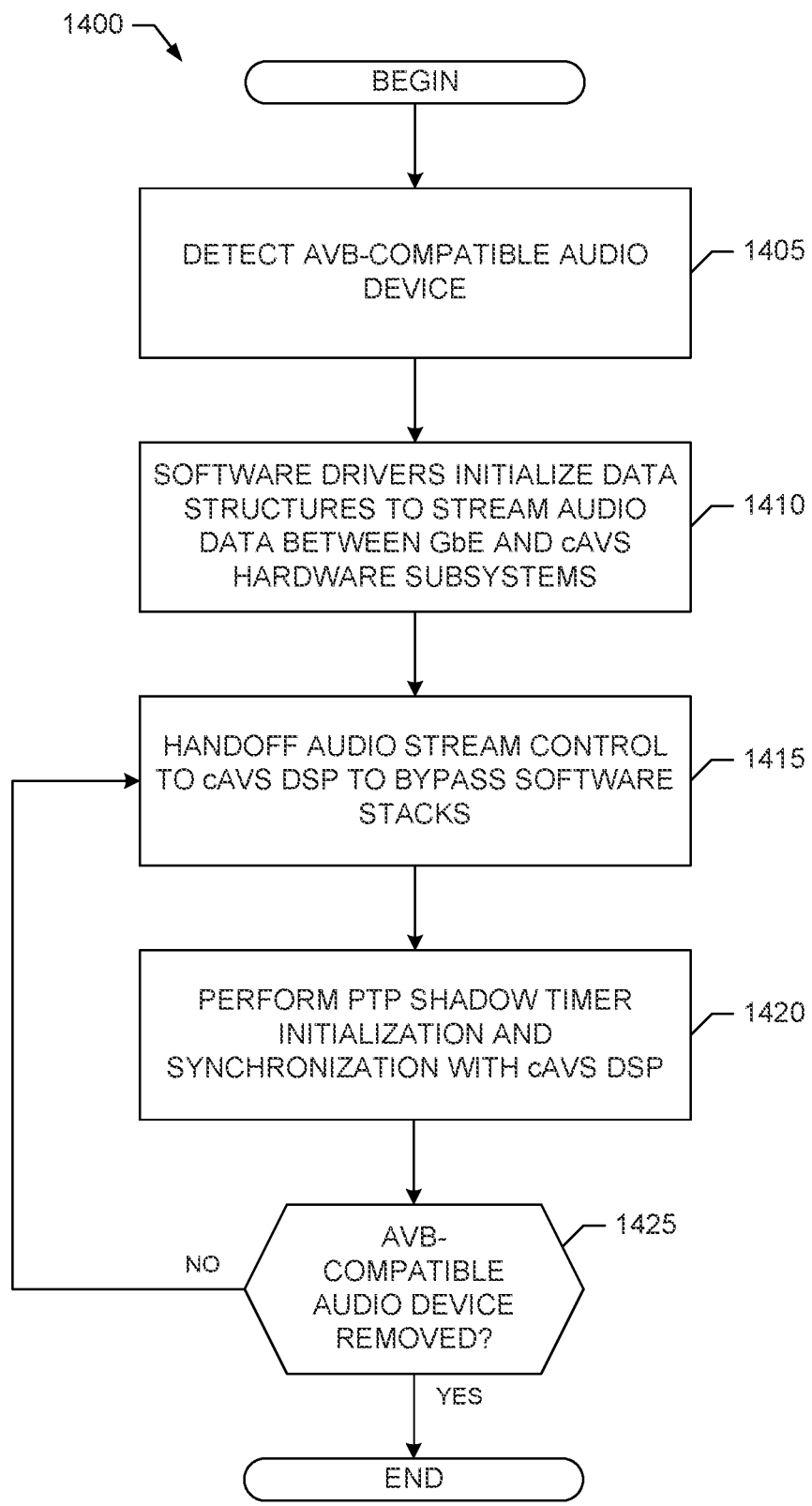
FIG. 14 illustrates example computer readable instructions that may be executed to implement the ADA feature in the example SoC integrated circuit of FIG. 2.

The example program 1400 of FIG. 14 begins at block 1405 at which the GbE subsystem 108 of the SoC 122 detects, as described above, the presence of an AVB endpoint device, such as the AVB endpoint device 102, in the AVB system 100. At block 1410, the AVB driver 110 and the audio driver 114 of the SoC 122 operate, as described above, to initiate the AVB data structures to allow the audio stream(s) associated with the AVB endpoint device 102 detected at block 1405 to be offloaded to a direct hardware path between the GbE subsystem 108 and the cAVS subsystem 116. As described above, the direct hardware path is implemented via the DDR memory 112 of the SoC 122. At block 1415, the AVB driver 110 and the audio driver 114 of the SoC 122 transfer audio stream control to the DSP 234 of the cAVS subsystem 116, as described above, which enables the audio stream to be communicated between the GbE subsystem 108 and the cAVS subsystem 116 via the direct hardware path implemented with the DDR memory 112 while bypassing the AVB driver 110 and the audio driver 114. At block 1420, the cAVS subsystem 116 initializes and maintains synchronization of its PTP shadow timer, as described above. The processing at blocks 1415 and 1420 continues until the AVB endpoint device 102 is removed (e.g., disconnected) from the AVB system 100 (block 1425).

Figure 15:
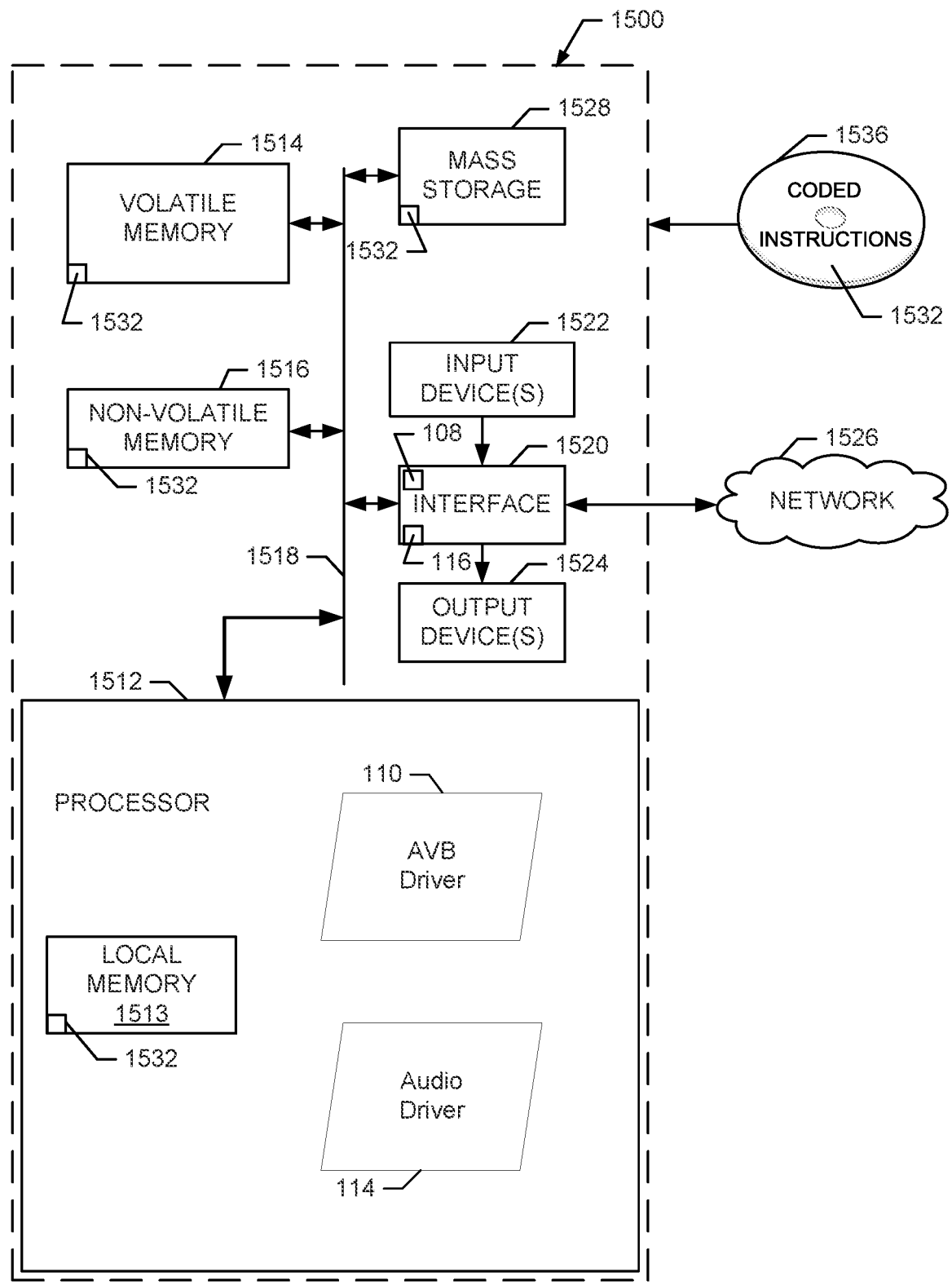
FIG. 15 is a block diagram of an example processing platform structured to execute the instructions of FIGS. 8, 9, 12 and 13 to implement the example SoC integrated circuit of FIG. 2.

FIG. 15 is a block diagram of an example processor platform 1500 structured to execute the instructions of FIGS. 8, 9, 12, 13 and/or 14 to implement the SoC 122 of FIGS. 1-13. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a control unit device in a vehicle or industrial installation, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements AVB driver 110 and the audio driver 114 of the SoC 122.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface. In the illustrated example of FIG. 5, the interface circuit 1520 implements the GbE subsystem 108 and the cAVS subsystem 116 of the SoC 122.

In the illustrated example, one or more input devices 1522 are connected to the interface circuit 1520. The input device(s) 1522 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, may include a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 8, 9, 12, 13 and/or 14 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that implement an AVB direct attach feature to use a direct hardware path, instead of a software-based path, to communicate audio stream data between the audio and GbE subsystems used to process audio stream(s) associated with an AVB endpoint device. The disclosed methods, apparatus and articles of manufacture improve the efficiency of using a computing device, such as an entertainment unit, by reduce audio streaming latency between the audio and Gigabit Ethernet subsystems that process the audio stream(s) associated with the AVB endpoint device. The disclosed methods, apparatus and articles of manufacture are accordingly directed to one or more improvement(s) in the functioning of a computer.

The foregoing disclosure provides examples of implementing an AVB direct attach feature to reduce audio streaming latency between audio and GbE subsystems by using a direct hardware path, instead of a software-based path, to communicate audio stream data between the audio and GbE subsystems. The following further examples, which include subject matter such as an integrated circuit to process an audio stream associated with an endpoint on an AVB network, an entertainment unit including such an integrated circuit, at least one computer-readable storage medium including instructions that, when executed by at least one processor, cause the at least one processor to process an audio stream associated with an endpoint on an AVB network, and a method to process an audio stream associated with an endpoint on an AVB network, are disclosed herein. The disclosed examples can be implemented individually and/or in one or more combinations.

Example 1 is an integrated circuit to process an audio stream associated with an endpoint device on a network. The integrated circuit of example 1 includes an Ethernet subsystem to access the network, an audio subsystem to process audio data associated with the audio stream, and a direct hardware path between the Ethernet subsystem and the audio subsystem to exchange audio data between the Ethernet subsystem and the audio subsystem without the audio data being processed by a first software driver that is to provide access to the Ethernet subsystem or a second software driver that is to provide access to the audio subsystem.

Example 2 includes the subject matter of example 1, and further includes double data rate (DDR) memory in communication with the Ethernet subsystem and the audio subsystem, the direct hardware path implemented by a data structure in the DDR memory.

Example 3 includes the subject matter of example 2, wherein the data structure includes a circular ring of work descriptors and a payload section including payload buffers, respective ones of the work descriptors pointing to respective ones of the payload buffers.

Example 4 includes the subject matter of any one of examples 1 to 3, wherein the endpoint device is a first endpoint device, the audio stream is a first audio stream, the audio data is first audio data, and at least one of the first software driver or the second software driver is to process second audio data to be exchanged between the Ethernet subsystem and the audio subsystem, the second audio data associated with a second audio stream, the second audio stream associated with a second endpoint device different from the first endpoint device.

Example 5 includes the subject matter of any one of examples 1 to 4, wherein the first software driver is to detect the endpoint device associated with the audio stream, and query the second software driver to determine whether the audio stream is to be offloaded to the direct hardware path.

Example 6 includes the subject matter of example 5, wherein the first software driver is to determine whether the audio stream is to be offloaded to the direct hardware path based on a whitelist specifying at least one of device types, device identifiers, vendor identifiers, virtual local area network (VLAN) tags, VLAN priorities, stream identifiers or destination medium access control (DMAC) addresses.

Example 7 includes the subject matter of any one of examples 1 to 6, and further includes a digital signal processor (DSP) to control communication of the audio data between the Ethernet subsystem and the audio subsystem using the direct hardware path.

Example 8 includes the subject matter of any one of examples 1 to 7, wherein the audio data is formatted in accordance with an audio video bridging (AVB) protocol.

Example 9 is an entertainment unit including an audio peripheral and an integrated circuit. The integrated circuit of FIG. 9 includes an Ethernet subsystem to access a network, a first software driver to provide access to the Ethernet subsystem, an audio subsystem to process audio data associated with an audio stream, the audio stream associated with an endpoint device in communication with the network, a second software driver to provide access to the audio subsystem, and memory in communication with the Ethernet subsystem and the audio subsystem to store a data structure to exchange the audio data between the Ethernet subsystem and the audio subsystem without the audio data being processed by the first software driver or the second software driver.

Example 10 includes the subject matter of example 9, wherein the data structure includes a circular ring of work descriptors and a payload section including payload buffers, respective ones of the work descriptors pointing to respective ones of the payload buffers.

Example 11 includes the subject matter of example 9 or 10, wherein the first software driver is to detect the endpoint device associated with the audio stream, and query the second software driver to determine whether the audio stream is to be offloaded for communication between the Ethernet subsystem and the audio subsystem using the data structure stored in the memory.

Example 12 includes the subject matter of example 11, wherein the first software driver is further to determine, based on a whitelist specifying at least one of device types, device identifiers, vendor identifiers, virtual local area network (VLAN) tags, VLAN priorities, stream identifiers or destination medium access control (DMAC) addresses, whether the audio stream is to be offloaded for communication between the Ethernet subsystem and the audio subsystem using the data structure stored in the memory.

Example 13 includes the subject matter of any one of examples 9 to 12, wherein the integrated circuit further includes a digital signal processor (DSP) to control communication of the audio data between the Ethernet subsystem and the audio subsystem using the data structure stored in the memory.

Example 14 includes the subject matter of any one of examples 9 to 13, wherein the audio data is formatted in accordance with an audio video bridging (AVB) protocol.

Example 15 includes at least one non-transitory computer readable medium including computer readable instructions that, when executed by at least one processor, cause the at least one processor to at least configure a direct hardware path between an Ethernet subsystem and an audio subsystem to exchange audio data between the Ethernet subsystem and the audio subsystem without the audio data being processed by a first software driver that is to provide access to the Ethernet subsystem or a second software driver that is to provide access to the audio subsystem, the audio data associated with an audio stream at least one of transmitted to or received from an audio endpoint device via a network, and synchronize a shadow precision time protocol timer with a precision time protocol timer maintained by the Ethernet subsystem.

Example 16 includes the subject matter of example 15, wherein the direct hardware path is implemented by a data structure stored in memory, the memory in communication with the Ethernet subsystem and the audio subsystem.

Example 17 includes the subject matter of example 15 or 16, wherein the data structure includes a circular ring of work descriptors and a payload section including payload buffers, respective ones of the work descriptors pointing to respective ones of the payload buffers.

Example 18 includes the subject matter of any one of examples 15 to 17, wherein the endpoint device is a first endpoint device, the audio stream is a first audio stream, the audio data is first audio data, and the instructions cause the at least one processor to invoke at least one of the first software driver or the second software driver to process second audio data to be exchanged between the Ethernet subsystem and the audio subsystem, the second audio data associated with a second audio stream, the second audio stream associated with a second endpoint device different from the first endpoint device.

Example 19 includes the subject matter of any one of examples 15 to 18, wherein the audio data is formatted in accordance with an audio video bridging (AVB) protocol.

Example 20 is a method to process an audio stream associated with an endpoint device on a network. The method of example 20 includes configuring, by executing an instruction with at least one processor, a direct hardware path between an Ethernet subsystem and an audio subsystem to exchange audio data between the Ethernet subsystem and the audio subsystem without the audio data being processed by a first software driver that is to provide access to the Ethernet subsystem or a second software driver that is to provide access to the audio subsystem, the audio data associated with the audio stream, the audio stream at least one of transmitted to or received from the endpoint device via the network, and synchronizing, by executing an instruction with the at least one processor, a shadow precision time protocol timer with a precision time protocol timer maintained by the Ethernet subsystem.

Example 21 includes the subject matter of example 20, wherein the direct hardware path is implemented by a data structure stored in memory, the memory in communication with the Ethernet subsystem and the audio subsystem.

Example 22 includes the subject matter of example 21, wherein the data structure includes a circular ring of work descriptors and a payload section including payload buffers, respective ones of the work descriptors pointing to respective ones of the payload buffers.

Example 23 includes the subject matter of any one of examples 20 to 22, wherein the endpoint device is a first endpoint device, the audio stream is a first audio stream, the audio data is first audio data, and further including invoking at least one of the first software driver or the second software driver to process second audio data to be exchanged between the Ethernet subsystem and the audio subsystem, the second audio data associated with a second audio stream, the second audio stream associated with a second endpoint device different from the first endpoint device.

Example 24 includes the subject matter of any one of examples 20 to 23, wherein the audio data is formatted in accordance with an audio video bridging (AVB) protocol.

Example 25 is an example computer readable medium that includes first instructions that, when executed, cause a machine to at least one of distribute, configure, assemble, install, instantiate, retrieve, decompress, and decrypt second instructions for execution, the second instructions to, when executed, cause a machine to at least: (1) configure a direct hardware path between an Ethernet subsystem and an audio subsystem to exchange audio data between the Ethernet subsystem and the audio subsystem without the audio data being processed by a first software driver that is to provide access to the Ethernet subsystem or a second software driver that is to provide access to the audio subsystem, the audio data associated with an audio stream at least one of transmitted to or received from an audio endpoint device via a network, and (2) synchronize a shadow precision time protocol timer with a precision time protocol timer maintained by the Ethernet subsystem.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An integrated circuit to process a data stream associated with an endpoint device on a network, the integrated circuit comprising:
a precision time protocol timer source including a first precision time protocol timer and a second precision time protocol timer;
a first subsystem configured to access the network, the first subsystem associated with a first driver to be executed by a host to provide access to the first subsystem, the first subsystem to maintain the first precision time protocol timer;
a second subsystem configured to process data associated with the data stream, the second subsystem associated with a second driver to be executed by the host to provide access to the second subsystem, the second subsystem to maintain the second precision time protocol timer, the second precision time protocol timer to be synchronized with the first precision time protocol timer, the second subsystem to communicate with the endpoint device to synchronize the data stream with the precision time protocol timer source of the integrated circuit; and
circuitry configured to offload the data stream from a first data path to a second data path to exchange the data associated with the data stream between the first subsystem and the second subsystem, the first data path to include the first driver and the second driver, the second data path to bypass the first driver and the second driver.

2. The integrated circuit of claim 1, wherein the data stream is a first data stream, the second subsystem is also to process a second data stream associated with the endpoint device, and the second subsystem is to communicate with the endpoint device to synchronize the second data stream with the precision time protocol timer source of the integrated circuit.

3. The integrated circuit of claim 1, further including a clock to drive the first subsystem, the second subsystem and the circuitry, wherein the first precision time protocol timer is based on an external time reference, and the second precision time protocol timer is to synchronize with the first precision time protocol timer based on a first value of the clock and a second value of the first precision time protocol timer.

4. The integrated circuit of claim 3, wherein the second precision time protocol timer is based on a second time reference different from the clock of the integrated circuit and the external time reference associated with the first precision time protocol timer.

5. The integrated circuit of claim 1, wherein the circuitry includes a shared memory to be accessed by the first subsystem and the second subsystem, the shared memory to store a circular ring of work descriptors and a payload section including payload buffers, respective ones of the work descriptors to point to respective ones of the payload buffers, the payload buffers to store the data associated with the data stream, ones of the work descriptors to include a respective ownership bit, and the first subsystem is to set the respective ownership bit of a first one of the work descriptors to indicate that first data stored in a respective first one of the payload buffers is to be processed by the second subsystem.

6. The integrated circuit of claim 1, wherein the data stream is an audio data stream to convey audio data, the first subsystem corresponds to an Ethernet subsystem to access the network based on an Ethernet protocol, and the second subsystem corresponds to an audio subsystem that is to process the audio data of the audio data stream.

7. An apparatus to process a data stream associated with an endpoint device on a network, the apparatus comprising:
a precision time protocol timer source including a first precision time protocol timer and a second precision time protocol timer; first means for accessing the network, the first means associated with a first driver to be executed by a host to provide access to the first means, the first means to maintain the first precision time protocol timer;
second means for processing data associated with the data stream, the second means associated with a second driver to be executed by the host to provide access to the second means, the second means to maintain the second precision time protocol timer, the second precision time protocol timer to be synchronized with the first precision time protocol timer, the second means to communicate with the endpoint device to synchronize the data stream with the precision time protocol timer source; and
third means for offloading the data stream from a first data path to a second data path to exchange the data associated with the data stream between the first means and the second means, the first data path to include the first driver and the second driver, the second data path to bypass the first driver and the second driver.

8. The apparatus of claim 7, wherein the data stream is a first data stream, the second means is also to process a second data stream associated with the endpoint device, and the second means is to communicate with the endpoint device to synchronize the second data stream with the precision time protocol timer source.

9. The apparatus of claim 7, further including a clock to drive the first means, the second means and the third means, wherein the first precision time protocol timer is based on an external time reference, and the second precision time protocol timer is to synchronize with the first precision time protocol timer based on a first value of the clock and a second value of the first precision time protocol timer.

10. The apparatus of claim 9, wherein the second precision time protocol timer is based on a second time reference different from the clock of the apparatus and the external time reference associated with the first precision time protocol timer.

11. The apparatus of claim 7, wherein the third means includes a shared memory to be accessed by the first means and the second means, the shared memory to store a circular ring of work descriptors and a payload section including payload buffers, respective ones of the work descriptors to point to respective ones of the payload buffers, the payload buffers to store the data associated with the data stream, ones of the work descriptors to include a respective ownership bit, and the first means is to set the respective ownership bit of a first one of the work descriptors to indicate that first data stored in a respective first one of the payload buffers is to be processed by the second means.

12. A system comprising: a peripheral device; an integrated circuit including:
a precision time protocol timer source including a first precision time protocol timer and a second precision time protocol timer;

a first subsystem configured to access a network, the first subsystem associated with a first driver to be executed to provide access to the first subsystem, the first subsystem to maintain the first precision time protocol timer;

a second subsystem configured to process data included in a data stream associated with the peripheral device, the second subsystem associated with a second driver to be executed to provide access to the second subsystem, the second subsystem to maintain the second precision time protocol timer, the second precision time protocol timer to be synchronized with the first precision time protocol timer, the second subsystem to communicate with the peripheral device to synchronize the data stream with the precision time protocol timer source of the integrated circuit; and circuitry configured to offload the data stream from a first data path to a second data path to exchange the data between the first subsystem and the second subsystem, the first data path to include the first driver and the second driver, the second data path to bypass the first driver and the second driver; and a host device configured to: execute the first driver to access the first subsystem; and execute the second driver to access the second subsystem.

13. The system of claim 12, wherein the data stream is a first data stream, the second subsystem is also to process a second data stream associated with the peripheral device, and the second subsystem is to communicate with the peripheral device to synchronize the second data stream with the precision time protocol timer source of the integrated circuit.

14. The system of claim 12, further including a clock to drive the first subsystem, the second subsystem and the circuitry, wherein the first precision time protocol timer is based on an external time reference, and the second precision time protocol timer is to synchronize with the first precision time protocol timer based on a first value of the clock and a second value of the first precision time protocol timer.

15. The system of claim 14, wherein the second precision time protocol timer is based on a second time reference different from the clock of the integrated circuit and the external time reference associated with the first precision time protocol timer.

16. The system of claim 12, wherein the circuitry includes a shared memory to be accessed by the first subsystem and the second subsystem, the shared memory to store a circular ring of work descriptors and a payload section including payload buffers, respective ones of the work descriptors to point to respective ones of the payload buffers, the payload buffers to store the data associated with the data stream, ones of the work descriptors to include a respective ownership bit, and the first subsystem is to set the respective ownership bit of a first one of the work descriptors to indicate that first data stored in a respective first one of the payload buffers is to be processed by the second subsystem.

17. The system of claim 12, wherein the data stream is an audio data stream to convey audio data, the first subsystem corresponds to an Ethernet subsystem to access the network based on an Ethernet protocol, and the second subsystem corresponds to an audio subsystem that is to process the audio data of the audio data stream.

\* \* \* \* \*